Jan. 17, 1961    J. C. BELLAMY    2,968,793
SYSTEM, METHOD AND APPARATUS FOR PROCESSING
DATA OR INFORMATION
Original Filed March 22, 1952    16 Sheets-Sheet 2
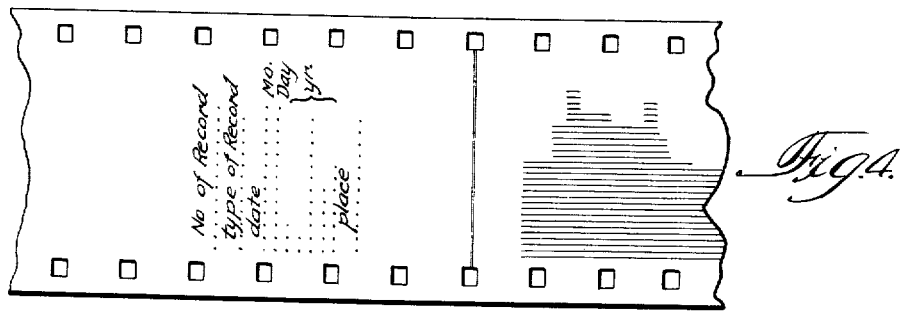
_Fig. 4._
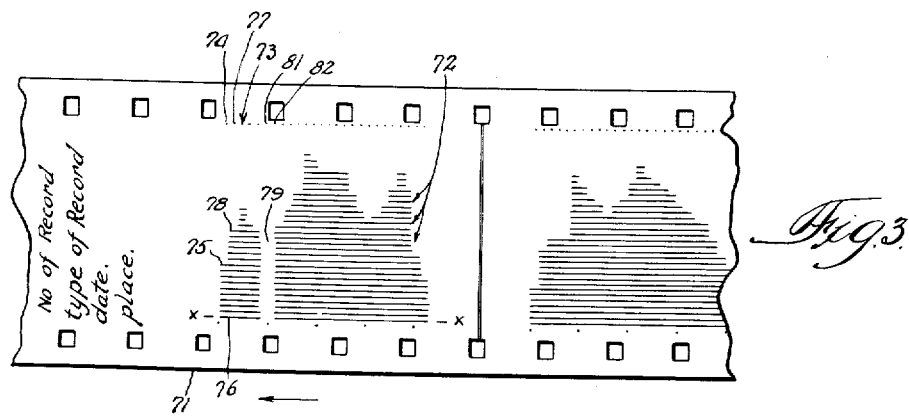
_Fig. 3._
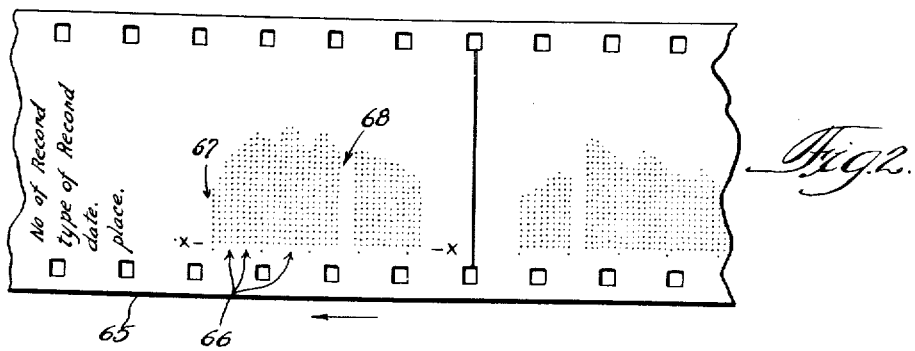
_Fig. 2._
INVENTOR.
John C. Bellamy.
BY
Thiess, Olsen & Mecklenburg
Atty.

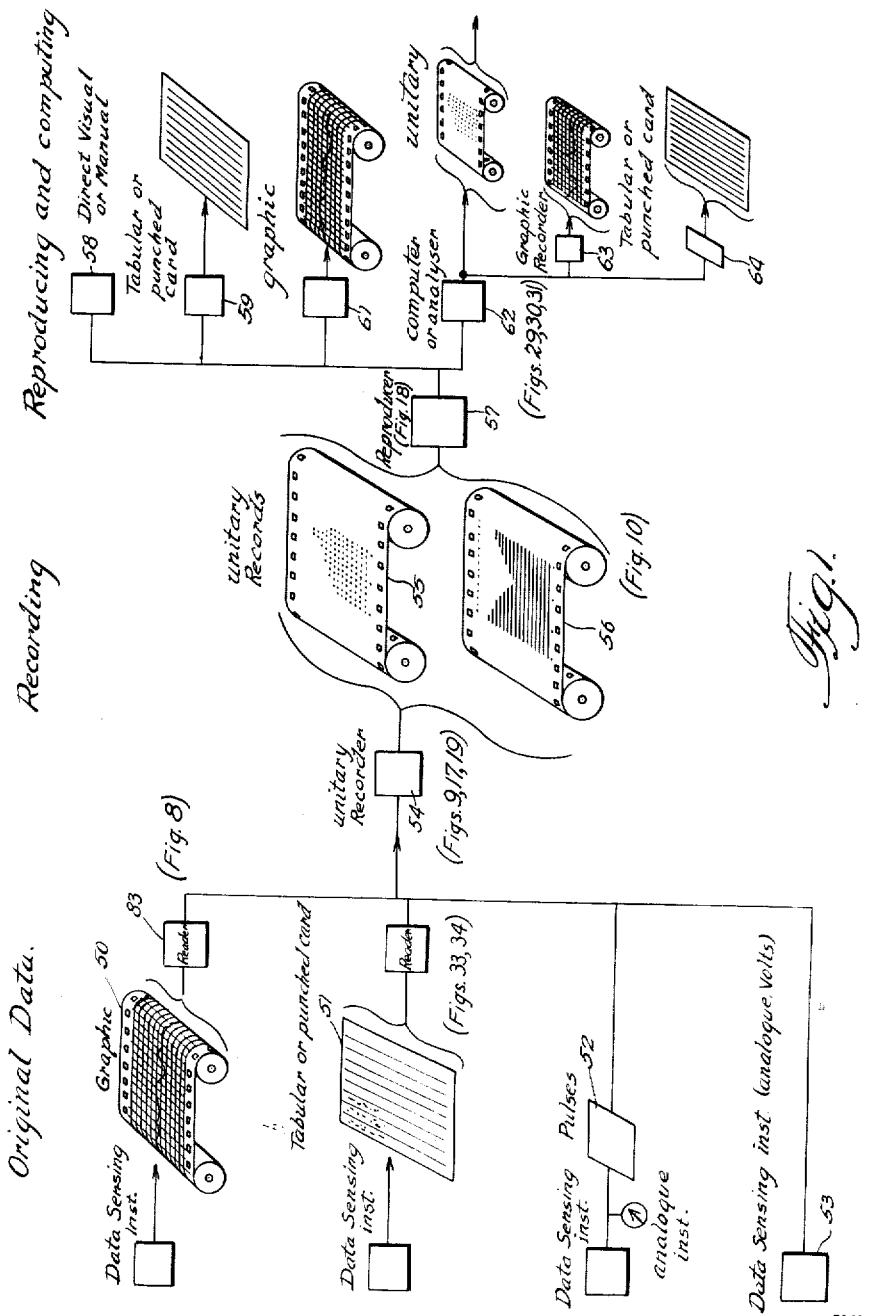

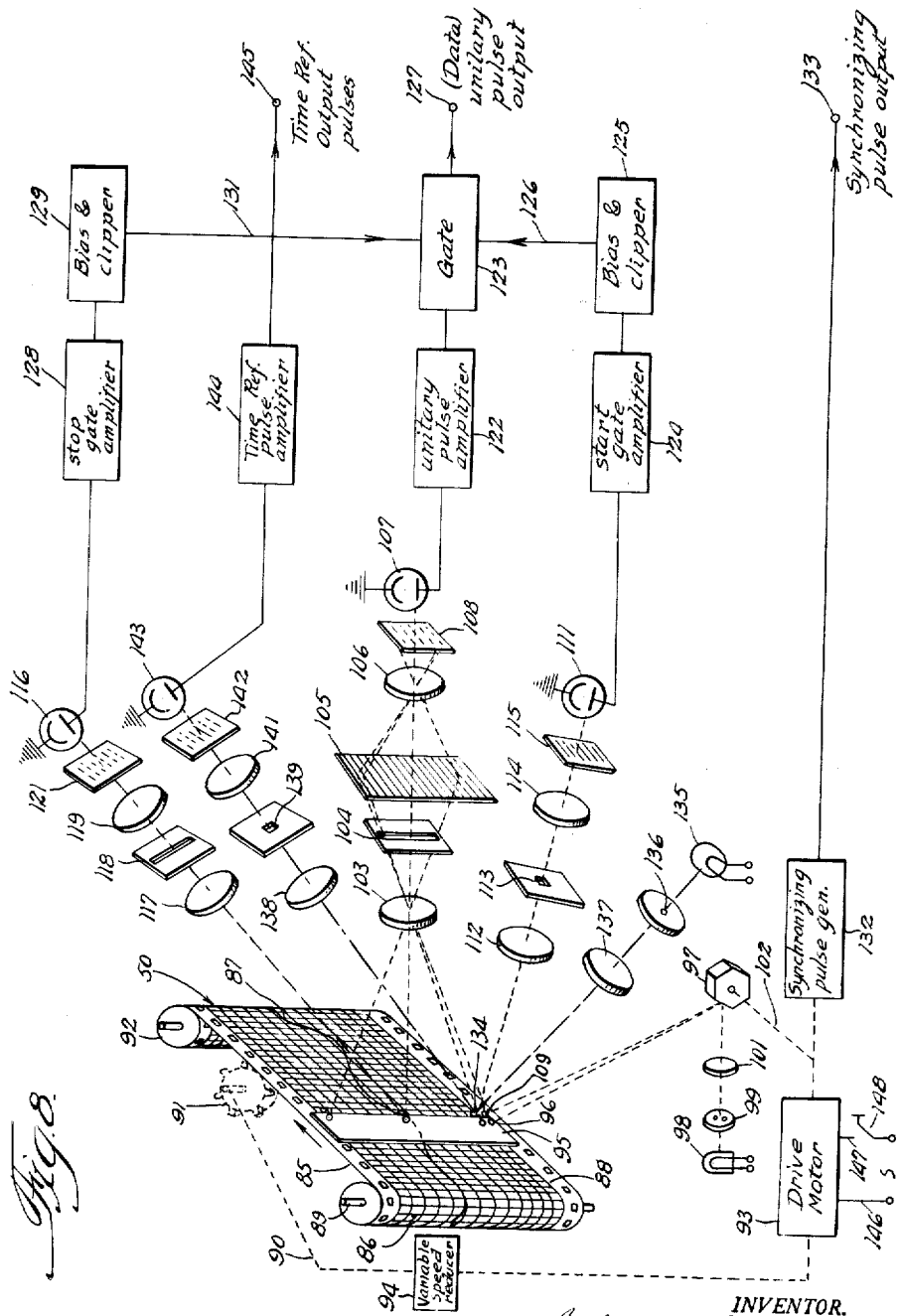

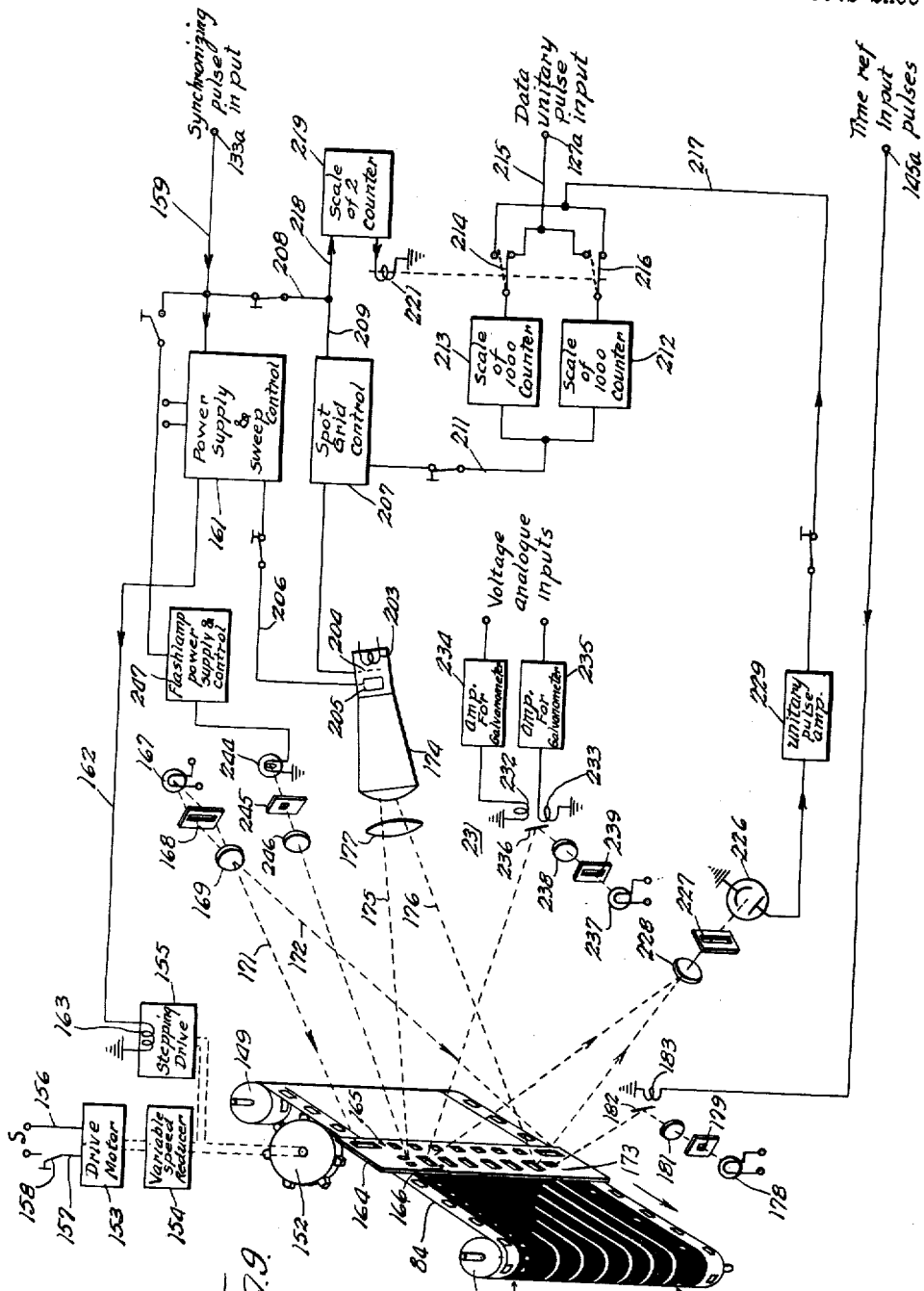

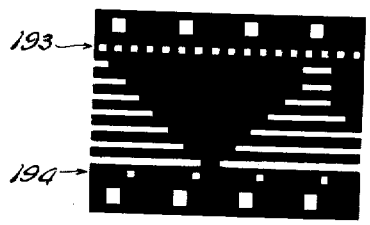
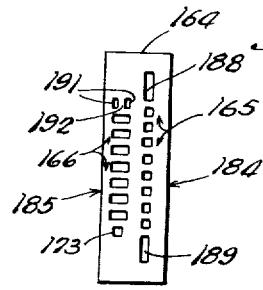
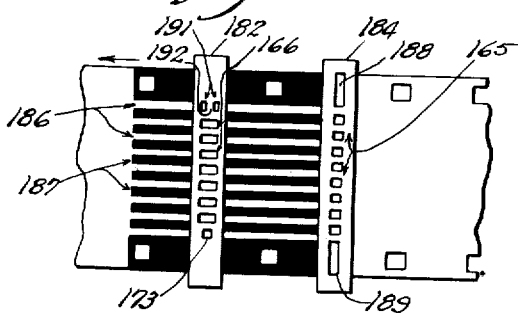
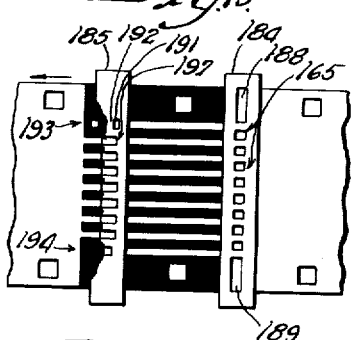
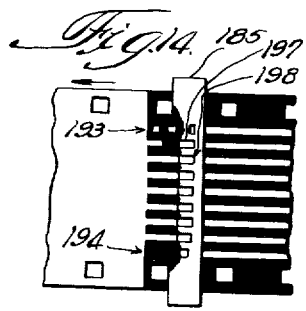
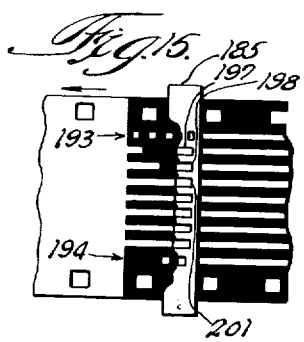
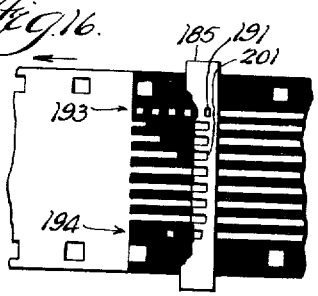

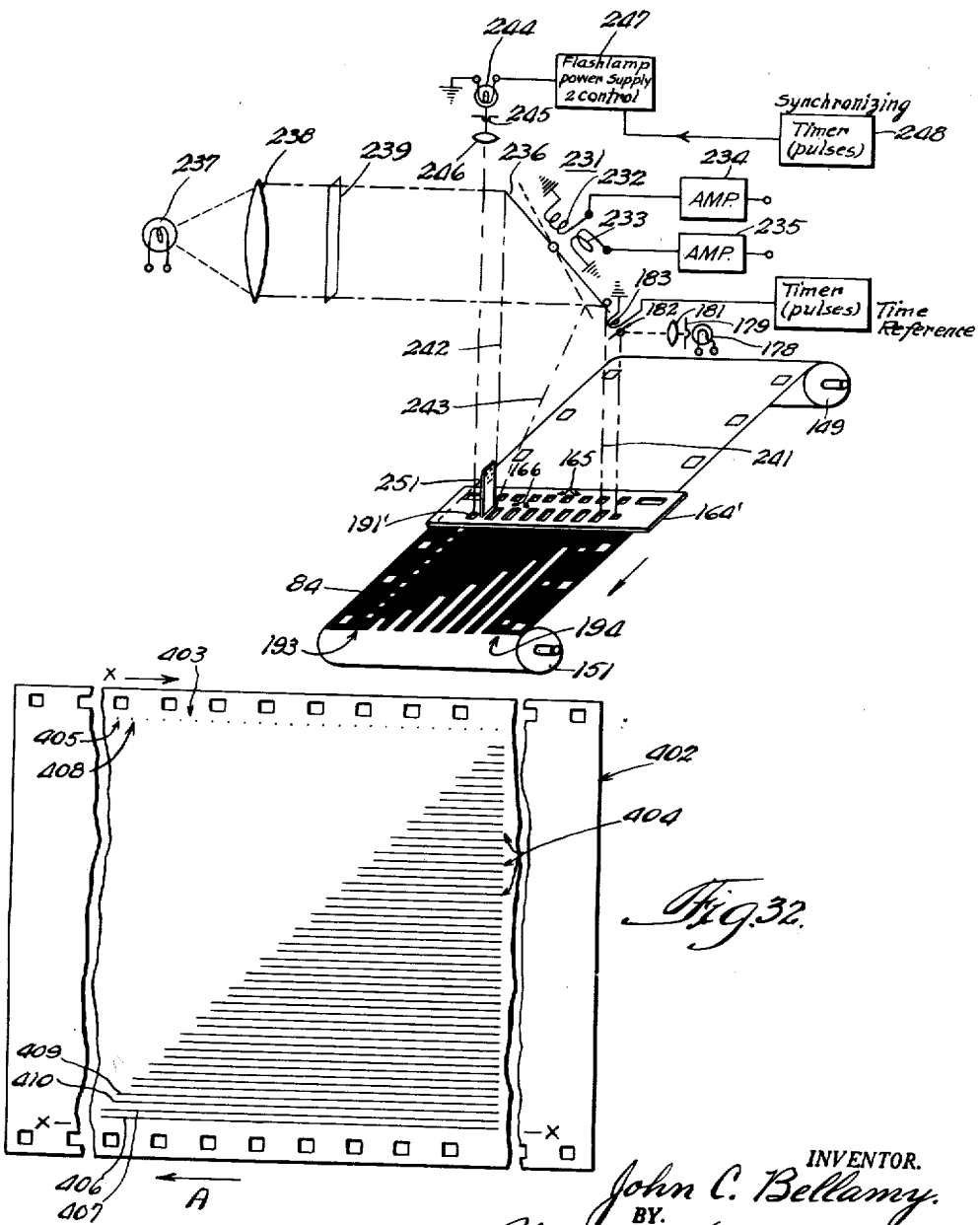

Jan. 17, 1961

J. C. BELLAMY 2,968,793

SYSTEM, METHOD AND APPARATUS FOR PROCESSING
DATA OR INFORMATION

Original Filed March 22, 1952

INVENTOR.
John C. Bellamy.
BY
Thiess, Olson & Mecklenburger
Atty's.

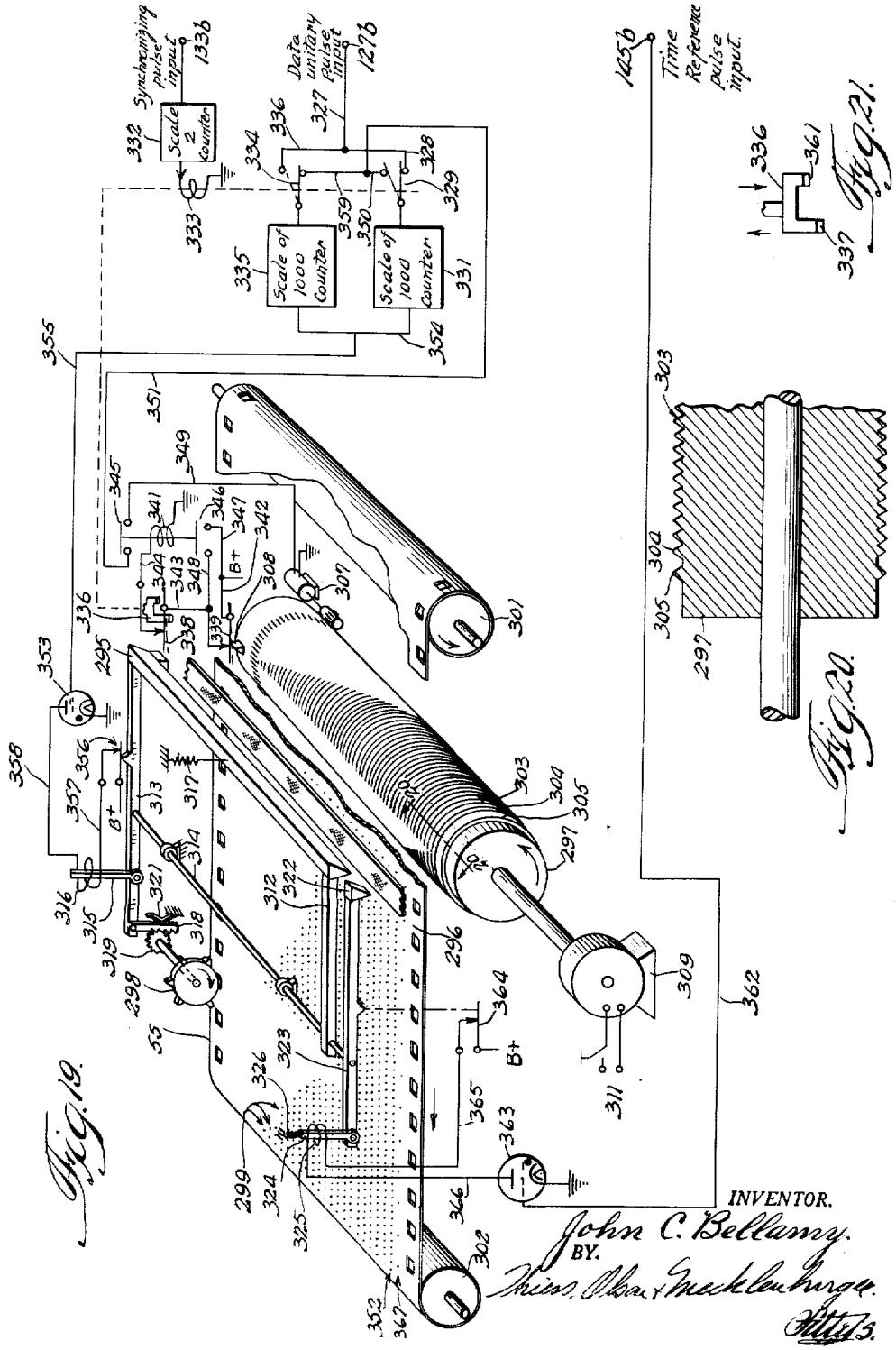

Jan. 17, 1961  J. C. BELLAMY  2,968,793
SYSTEM, METHOD AND APPARATUS FOR PROCESSING
DATA OR INFORMATION
Original Filed March 22, 1952
16 Sheets-Sheet 10
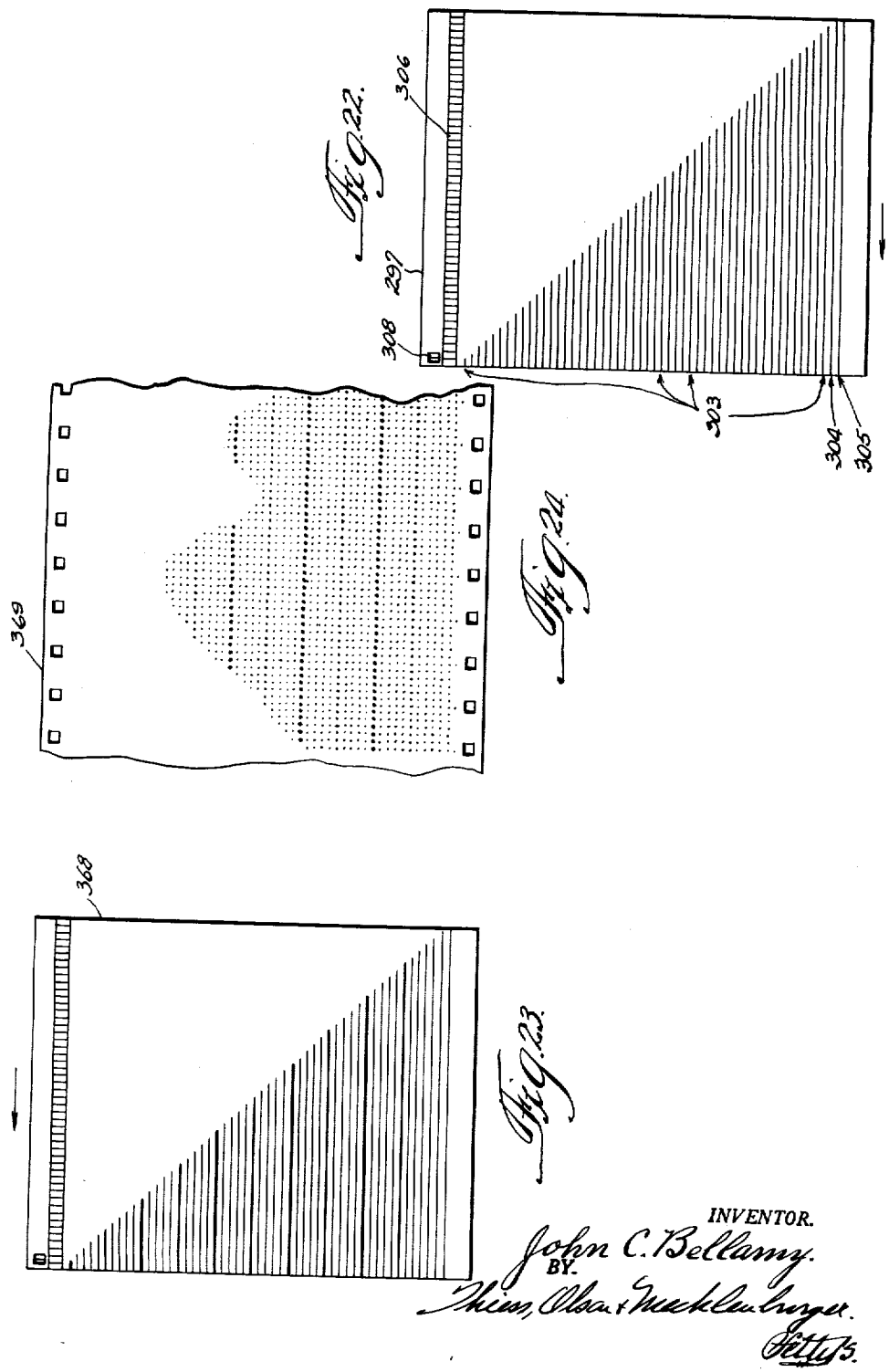
INVENTOR.
John C. Bellamy.

Jan. 17, 1961  
J. C. BELLAMY  
SYSTEM, METHOD AND APPARATUS FOR PROCESSING DATA OR INFORMATION  
2,968,793  
Original Filed March 22, 1952  
16 Sheets-Sheet 11
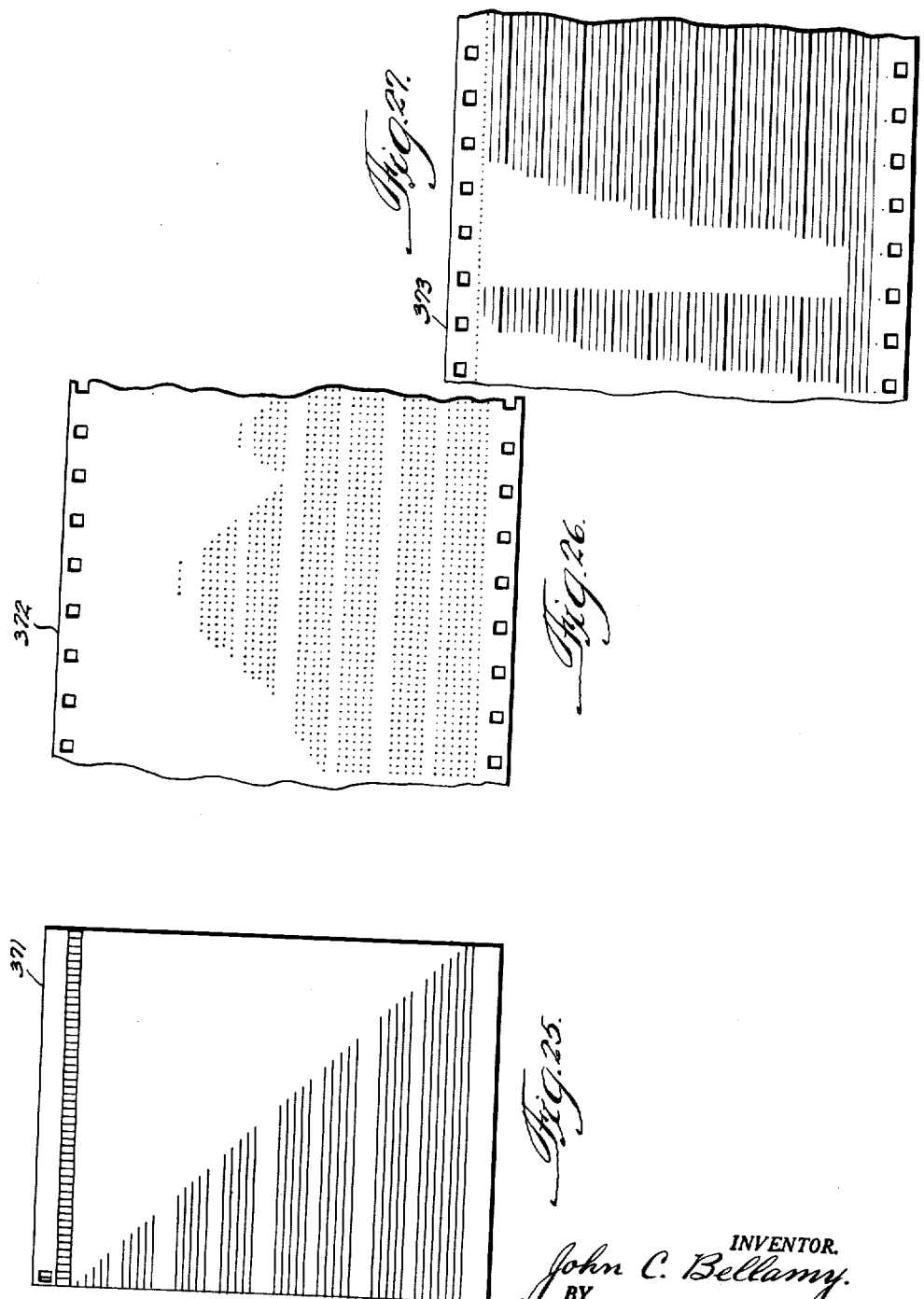
INVENTOR.  
John C. Bellamy Jan. 17, 1961
J. C. BELLAMY
2,968,793
SYSTEM, METHOD AND APPARATUS FOR PROCESSING DATA OR INFORMATION
Original Filed March 22, 1952
16 Sheets-Sheet 12
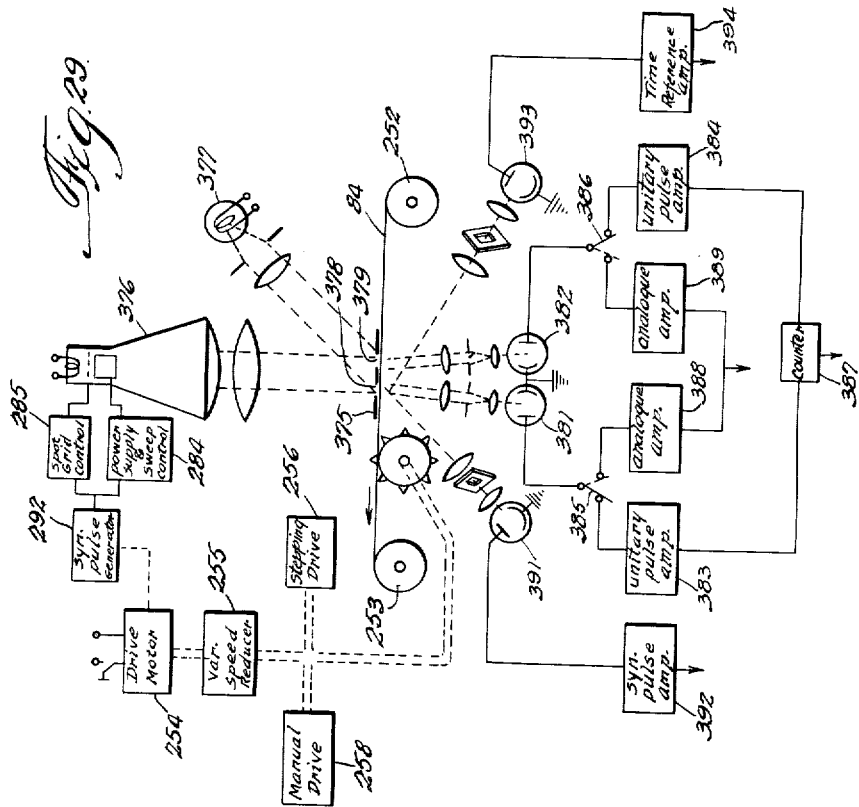
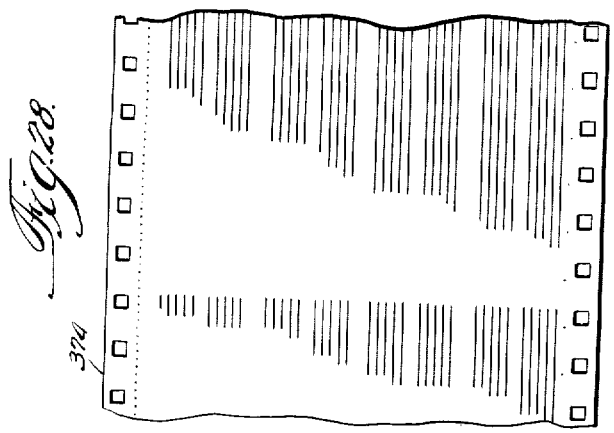
INVENTOR.
John C. Bellamy.
BY

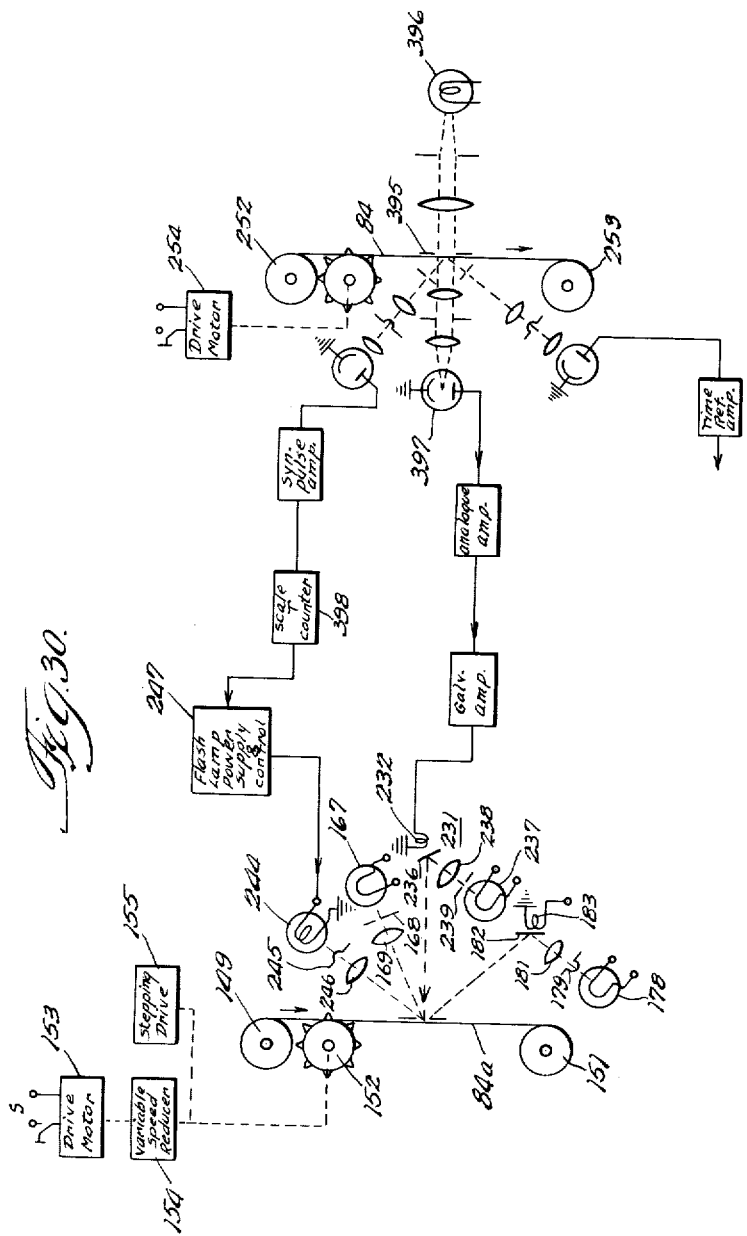

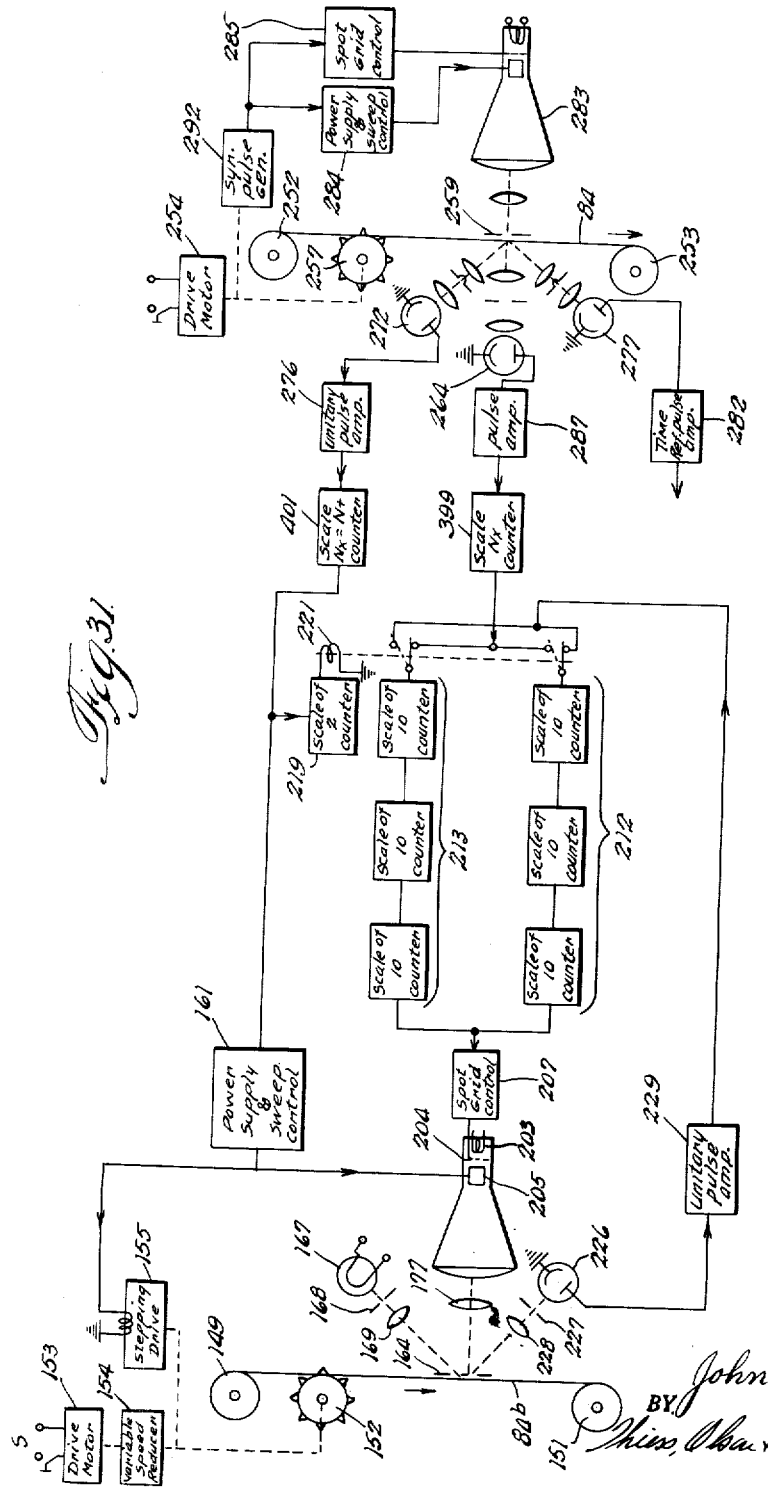

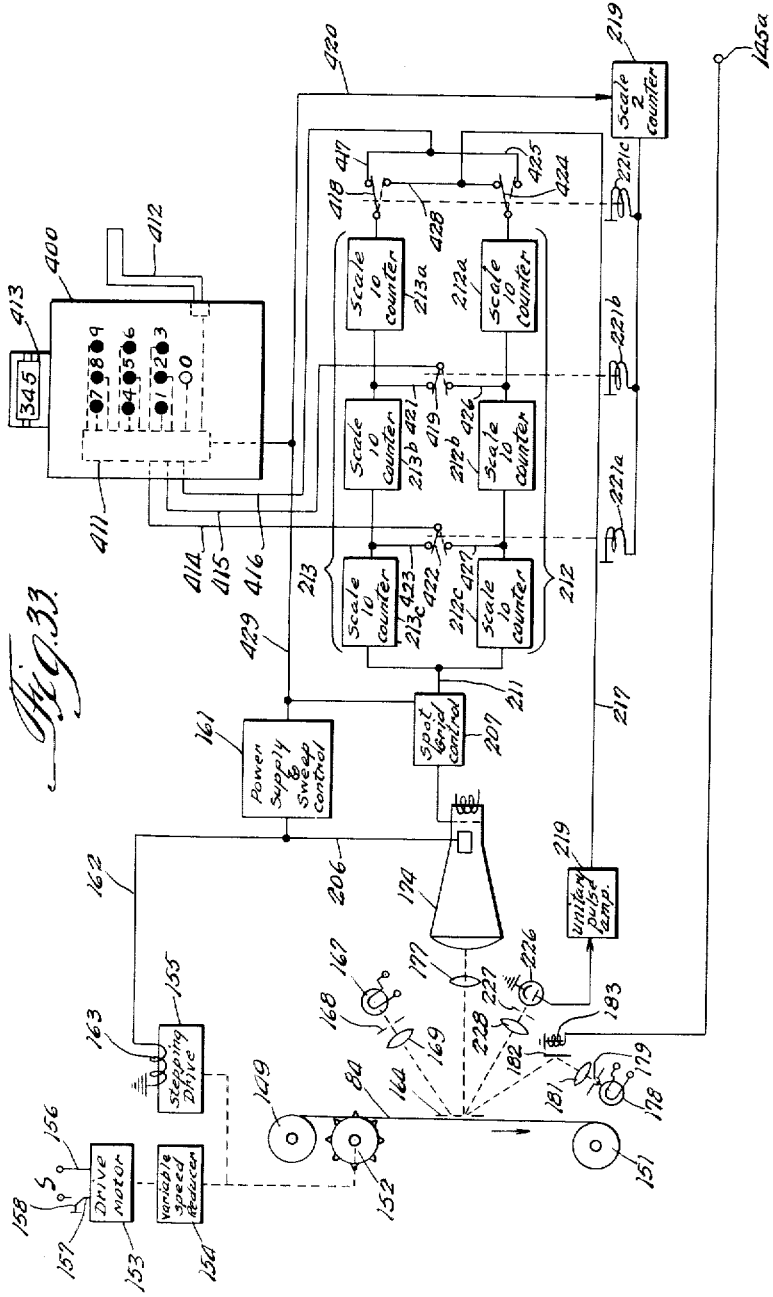

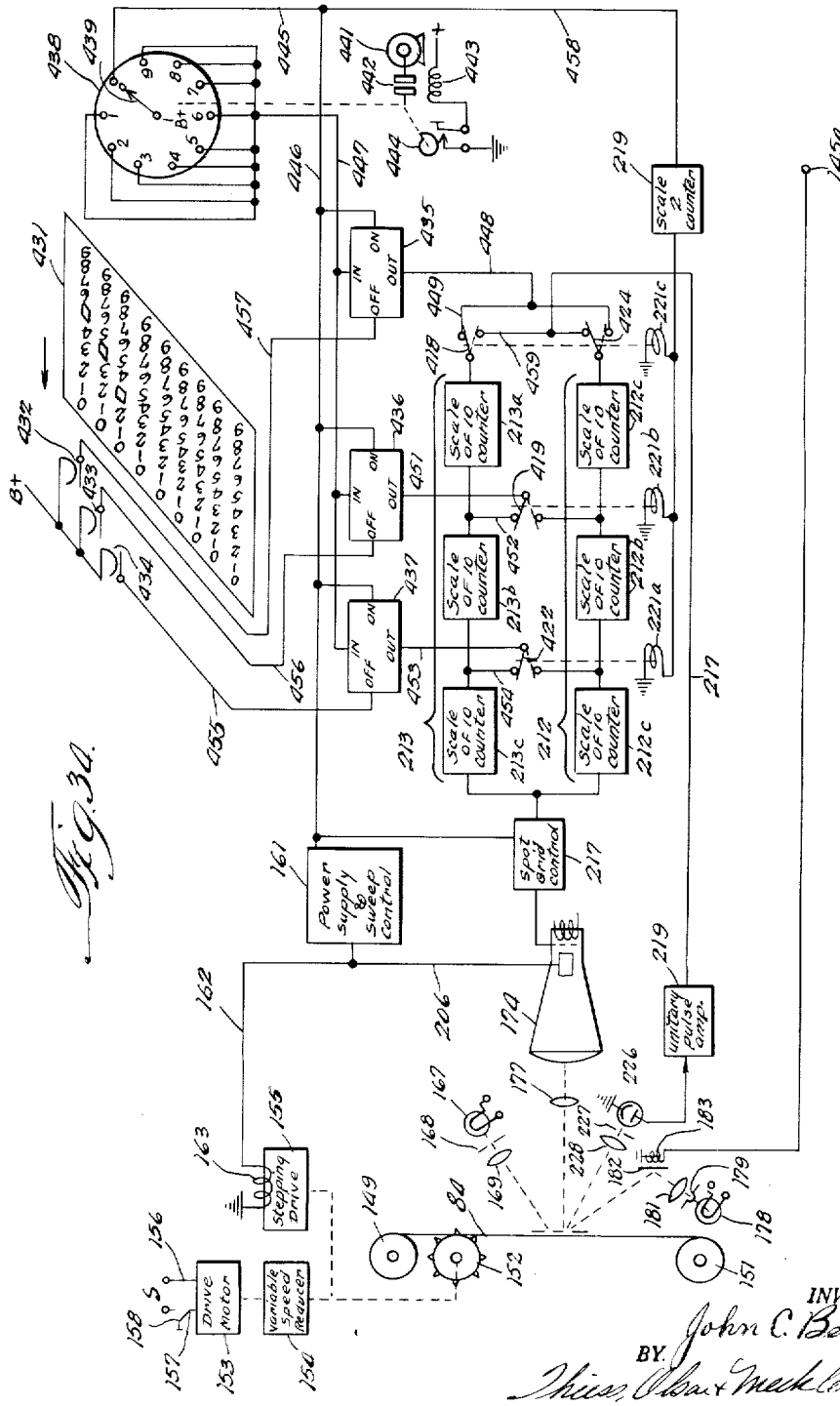

United States Patent Office 2,968,793
Patented Jan. 17, 1961

2,968,793

SYSTEM, METHOD AND APPARATUS FOR PROCESSING DATA OR INFORMATION

John C. Bellamy, Barrington, Ill., assignor, by mesne assignments, to Cook Electric Company, Chicago, Ill., a corporation of Delaware Continuation of application Ser. No. 278,038, Mar. 22, 1952. This application Apr. 24, 1958, Ser. No. 731,585

15 Claims. (Cl. 340—172.5)

This is a continuation of the applicant's copending application Serial No. 278,038, now abandoned filed March 22, 1952. The invention described and claimed herein relates to systems of processing data or information including apparatus for recording, transcribing, analyzing, computing, and re-recording. More particularly, it relates to methods and apparatus for processing large amounts of data or information, usually observational, with rather simple calculations or reductions, rapidly, efficiently and accurately, and it is an object of the invention to provide an improved method and apparatus of this character.

The term data, as used herein, is defined to include all information; for example, original observations, calculations, analyses, functional relationships or the like, whether in graphical or other form.

In the sciences in which known physical laws define the relationship between relatively few parameters, highly accurate large scale digital computers have been developed which will give the results of desired computations involving these laws in short intervals of time. This form of apparatus as well as others, for example, differential analyzers with their concepts and methods, provide satisfactory approaches to and solutions of such problems. Recording the solutions is a simple matter since usually there are relatively few computations to be made, and graphical recording such as handwriting or typewriting, or recording by means of punched cards or tapes is completely satisfactory.

In scientific fields, such as meteorology and other geophysical disciplines, the method of approach is, of necessity, different. The pertinent factors while perhaps not unknown are not fully understood, and they may be large in number. In these instances, the usual procedure entails observation of the various variable factors over long periods of time and at many points, recordation of observational data, and then analysis and evaluation. For example, in the case of weather observation, measurements of temperature, atmospheric pressure, wind direction and velocity, etc., have been made for many years, at many stations and at various altitudes. Continuing improvements in apparatus and technique have enabled observations and records of the foregoing character in this as well as in other fields to be made at ever increasing rates so that a very large amount of observed data exist.

Such data exists in the form of continuous graphs or strip charts, tabulations, and analogue recordings on mediums such as magnetic tape or strip charts and in the form of punched holes on cards or tapes. To make an analysis involving use of data of the character described, then, involves the handling of large masses of material. To make a relatively few simple calculations on such data extending over a period of time as short as a year might involve a prohibitive number of persons. It is largely for this reason that much observational data of the character referred to has remained in its storage vaults unused.

Conceivably, for the requirements of a particular problem, sufficient man power might be mobilized to make a lengthy analysis of weather records. However, it would be virtually impossible on account of the expense, number of people and time required, to do any extensive weather research with the data in its present form.

Accordingly, it is a further object of the invention to provide an improved method and apparatus for recording, transcribing, analyzing, and computing existing data of the character described rapidly, efficiently and accurately.

It is a further object of the invention to provide an improved form of record for storing data.

It is a further object of the invention to provide an improved record of functionally related factors for making computations.

The existing records of observational data are voluminous and time consuming to handle physically and to obtain data therefrom. Accordingly, it is a further object of the invention to provide an improved method, apparatus and form of record for recording observations, the results of computations or any other data which will largely reduce space needed for recording and from which the data may be processed rapidly, automatically, and manually.

It is a further object of the invention to provide an improved method, apparatus and form of record of the character described which are adaptable to recording data from sensing instruments in the first instance as well as to the re-recording of such data already existing in the form of strip charts, tabulations, punched cards or tapes, etc.

It is a further object of the invention to provide an improved method, apparatus and form of record of the character described for recording and reproducing data by means of analogue or unitary techniques.

It is a further object of the invention to provide an improved method, apparatus and form of record for recording data whereby such record will retain all of the data upon the original record as well as all of the accuracy.

It is a further object of the invention to provide an improved method, apparatus and form of record for recording data whereby such record will preserve the visual character of the original record, particularly if this is in the form of a graph.

It is a further object of the invention to provide an improved method, apparatus and form of record for representation of data whether the values thereof are continuous, successive, discrete or singular.

For a more complete understanding of the invention, reference should be made to the accompanying drawings in which:

Fig. 1 is a schematic representation of a data processing system embodying the invention;

Figs. 2, 3, 4, 5, 6 and 7 are diagrams of types of records according to one aspect of the invention;

Fig. 8 is a schematic representation of apparatus for reading strip chart records according to one aspect of the invention;

Fig. 9 is a schematic representation of photographic apparatus for recording data in the form shown in Fig. 3, according to one aspect of the invention;

Fig. 10 is a simplified representation of exposed photographic film recorded by the apparatus of Fig. 9;

Fig. 11 is an elevational view of one portion of the apparatus illustrated in Fig. 9;

Figs. 12, 13, 14, 15 and 16 are simplified representations of exposed photographic film during successive steps in recording by the apparatus illustrated in Fig. 9;

Fig. 17 is a schematic representation on a larger scale of a portion of the apparatus illustrated in Fig. 9;

Fig. 18 is a schematic representation of apparatus for reproducing data from records made according to the apparatus and method of Fig. 9;

Fig. 19 is a schematic representation of apparatus for recording data in the form shown in Fig. 2, for example, upon paper according to another aspect of the invention;

Fig. 20 is a fragmentary sectional view of apparatus taken substantially in the direction of arrows 20—20 in Fig. 19;

Fig. 21 is a fragmentary view of other apparatus shown in Fig. 19;

Fig. 22 is a schematic view in developed form of one portion of the apparatus illustrated in Fig. 19;

Fig. 23 is a schematic view similar to Fig. 22 of a modified form of apparatus;

Fig. 24 is a schematic view of a form of record to be made by the apparatus of Fig. 23;

Fig. 25 is a schematic view similar to Figs. 22 and 23 of another modified form of apparatus;

Fig. 26 is a schematic view of a form of record to be made by the apparatus of Fig. 25;

Figs. 27 and 28 are views of further forms of records according to the invention;

Fig. 29 is a schematic view of reproducing and computing apparatus according to one aspect of the invention;

Fig. 30 is a schematic view of one form of computing and re-recording apparatus according to the invention;

Fig. 31 is a schematic view of a further form of computing and re-recording apparatus according to the invention;

Fig. 32 is a schematic view of a form of transverse unitary record in which two variables are functionally related and from which computations can be made.

Fig. 33 is a schematic view of apparatus for recording data initially in tabular form according to the invention, and Fig. 34 is a schematic view of apparatus for recording data initially in punched card form according to the invention.

Figure 5:
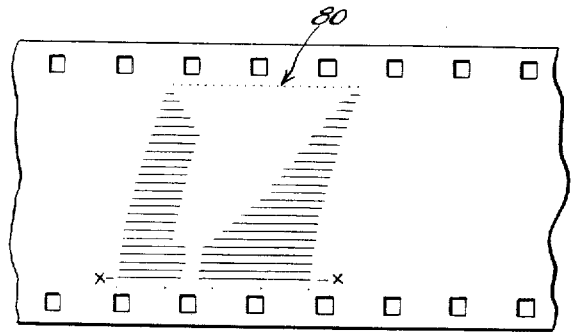

In the application Serial No. 165,844, now U.S. Patent No. 2,771,596, John C. Bellamy entitled "Improved Method and Apparatus for Recording and Reproducing Data," filed June 2, 1950 and assigned to the same assignee as the present invention, there is shown and claimed apparatus and methods for recording and reproducing data for which groups of discrete effects indicative of data value are made upon a medium, the groups of effects being spaced one after the other along the medium.

Referring to the drawings and more particularly to Fig. 1 thereof, the invention is shown as comprising a system of data processing including methods and apparatus. The original data, in whatever form it may exist, is converted if necessary and recorded, according to the invention, into transverse unitary records from which the data may be reproduced and treated in any desirable fashion such as direct viewing, computing, or re-recording.

The original data may exist in the form of a line on a strip chart 50, in the form of numerical tabulations, or punched holes on cards 51 or the like, in the form of pulses from pulse creating apparatus 52, analogue quantities such as a voltage from instrument 53 or some other form. In each of these instances, the data is supplied in an appropriate form to the unitary recorder 54 which makes records in either of the forms designated 55 and 56.

Reproducing data on records of the form 55 and 56 is accomplished by a reproducer 57 from which appropriate signals are obtained to enable the data to be viewed directly in apparatus 58, to be tabulated or placed on punched cards by apparatus 59, to be re-recorded in graphic form by apparatus 61, or to be processed by a computer or analyzer 62. After reproduction, re-recordings may be made in transverse unitary, graphic, tabular or punched card form by apparatus 63 and 64 respectively.

The universality of the data processing system is an important feature of this invention as may be seen from Fig. 1. That is to say virtually any type of data may be taken and recorded initially or re-recorded subsequently in the form of a single type of record embodying all the characteristics of the original data and, reproductions, computations and analyses may be made in any form from the record. The record itself is, then, an important feature of the present invention and is a universal type of record since all forms of data may be transcribed into it and all types of reproductions may be made therefrom.

The universal record according to the invention may be characterized as a transverse unitary record in that each unit of data has one mark made for it, the marks for each sample of data lying along a uniform line and the lines for respective samples of data lying alongside each other so that recordings and reproductions are made by relative transverse movement of the medium and the apparatus. The universal record results from reducing the data to its simplest form, that is, to units and to one mark for each unit in the recording. The universal record according to the invention is adaptable to single values of data, to data having a large number of successive discrete values, and to data in continuous form. Moreover, the universal record according to the invention retains the visual characteristics of the original data and may be reproduced either manually or automatically with relatively simple apparatus and as rapidly or slowly as desired.

The nature of the universal record according to the invention may be understood by referring to Figs. 2 and 3.

In Fig. 2, there is shown a section of 35 millimeter photographic film 65, for example, upon which are disposed a series of side-by-side rows 66 of marks or dots. For easy reproducibility, the dots are dark and the surrounding film is transparent although the reverse type, that is of dark film with light dots, may be used. Each one of the rows represents one sample, or piece, of data and successive pieces of data are represented by successive side-by-side rows of dots, the record 65 being intended to move in the direction of the arrow during recording as well as during reproducing.

Each dot in each row represents one unit of data value. For example, in the first row 67 there are eight dots above the line of dots designated x—x, thereby indicating that there are eight units in the piece of data represented by the row 67. If the data to be recorded were voltage, and the unit to be used were one volt, the row 67 would represent eight volts precisely. If the unit to be used were tenths of a volt, then row 67 would represent eight-tenths of a volt. Any conversion factor may, of course, be used so long as the same conversion factor applies to all rows of data and the unit selected embodies within it all of the accuracy in terms of full scale which is desired. That is to say, if a single dot or mark is to be made for each unit there can be no representation of fractional units. As will become apparent subsequently in this specification, fractional units of data are lost in the recording process so that a unit must be selected which in itself represents all of the accuracy desired and so that the loss of fractions of such a unit is of no consequence. For example, if the accuracy desired is one in a hundred, or one percent of full scale, then one hundred marks represents full scale and one hundred marks would be the total or maximum number of marks which could exist in any one row.

Since only individual dots or marks are made, there is a change of a complete unit in moving from one mark to the next in the same row. The record has within it this accuracy precisely and none other. While each mark or unit may represent one volt or a tenth of a volt, or any other multiple of a volt, the accuracy of the record is still only one percent of full scale. If the data to be recorded is desired to have an accuracy of one-tenth of one percent, which is to say, one in a thousand, the maximum number of dots which may exist in one row, for example row 67, is one thousand. But again the change from one mark to the next is in a discrete step and represents one unit of data having an accuracy of one-tenth of one percent in terms of full scale value.

The line of dots designated $x$—$x$ is termed a base line since all rows of data begin thereat. The dots in line $x$—$x$ represent, in this instance, a unitary time scale in which each dot identifies the position of a row of data. Such a line of dots representing the positions of the rows of data is essential, since zero is a perfectly proper value of data and is represented by no marks or dots being present as may be seen by the area 68. At the bottom of the area 68 there are three marks lying in the line $x$—$x$ indicating that the area 68 has within it three values of data each of which is zero, the three marks however, identifying the positions of the rows corresponding to the zero data values.

Within each row of data, the marks preferably are uniformly spaced apart and of uniform size. The marks are spaced apart a sufficient distance so that there is a clear demarcation between them and the space may be considerably larger than the size of the mark itself. The marks in each row preferably lie along a uniform line which is shown as being straight in Fig. 2 but may be curved slightly as will become clear subsequently in this specification. There should, however, be no undulations in the line since it is desired to preserve the visual characteristics of the recorded data and to reproduce it by a simple scanning operation. The rows of marks preferably are uniformly spaced from each other and may be spaced the same distance as the marks in each row are spaced from each other. The rows of marks should be substantially parallel to each other although some divergence may be permitted as will become clear subsequently in this specification.

Each of the rows of data must begin at the same base line which in Fig. 2 is represented by the line $x$—$x$. This line is shown as a straight line although some deviation in this respect may be permitted also. It will be evident that when the base line $x$—$x$ is essentially a straight line and the rows and the marks in each row are uniformly spaced, the ends of the rows opposite base line $x$—$x$ will form an outline resembling very much a graph of the original data. If the original data should exist in the form of a graph on a strip chart and a translation thereof is made into the form of Fig. 2, the outline formed by the ends of rows 66 is virtually the same as the shape of the original graph. The difference therebetween depends upon the accuracy desired in the re-recording. If an accuracy of one-tenth of one percent is utilized, substantially all of the accuracy existing in ordinary strip charts will be retained and the resemblance of the outline formed by the ends of the rows of marks and the original graph will be very close.

It has been found that one thousand dots or marks per inch may be made on photographic film without loss of accuracy in reproduction. With the rows of dots less than one-thousandth of an inch apart, it is evident that the continuity of the data is retained and the outline formed by the ends of the rows of marks will exactly resemble the original graph of data.

The line of marks lying along line $x$—$x$ may be disposed along the upper portion of the record 65 instead of along the bottom portion as shown, it being recalled that these marks identify the positions of the rows of data. If the line of marks in the line $x$—$x$ is disposed along the upper portion of the side, the individual marks therein must still lie along extensions of the uniform lines formed by the respective rows of data. The base line $x$—$x$ itself, which is an imaginary line, must still remain at the base of the rows of marks as shown since it is this base line from which the rows of marks must extend in order to retain the visual characteristics of the data.

The rows of marks extend transversely to the base line $x$—$x$ and may be perpendicular thereto although this is not essential.

After a record in the form of Fig. 2 has been made on a transparent medium, reproduction may be made in two ways. First a flying spot of light may be caused to scan across each row of dots and the resultant impulses of light may be counted by a photoelectric cell. The number of such pulses gives the data corresponding to that row. This reproducing method may be termed the unitary method. Second, a slit may be placed over each row of dots and a line or beam of light projected thereon and the total amount of light passing through the film sensed by a photoelectric cell. The resultant voltage of the photoelectric cell is then an analogue measure of the data value. This reproducing method may be termed the analogue method. Moreover, with a suitable enlargement of a single frame of photographic film, the number of marks could be counted invidiually or a scale could be laid along the row of marks and its length measured. With proper calibration this latter technique would give an analogue measure of the data value.

It will be evident that, since photographic film can be moved as rapidly as 64 or 128 frames per second, and since there can be one thousand rows of marks in each frame, it is feasible to place a large amount of data on a relatively small amount of film; and the film may be played back, that is moved past a reproducing slit at a very high rate. Since photoelectric cells and other electronic apparatus operate very rapidly, certain types of reproductions and computations can be made very rapidly.

A reading of data for each one-hundredth of an inch along a strip chart will, ordinarily, preserve all the data. Recording of such readings on a photographic film with a spacing between rows of data of one-thousandth of an inch is a saving of recording space of ten to one. In many strip charts, readings may be taken at greater intervals than one-hundreth of an inch with consequent greater savings in recording space.

With essentially continuous data, the recording film 65 will move continuously. For discontinuous data, the films will move intermittently. This is within the scope of the invention.

Each photographic record and the data on it may be identified by number, type, scale factors, etc. with an appropriate unitary code as will be described.

While the record 65 has been assumed to be a transparent photographic film with dark marks on it, it will be clear that other media, such as paper, magnetic tape etc., may be used and suitable marks or effects made on them. These marks, for example, may be dark spots or spots of any color or characteristic in order that light may be transmitted or reflected thereby. The marks may be actual openings in the medium itself, or variations in magnetic density of a magnetic tape. The marks or effects, within the scope of the invention, may be any reproducible or detectable effects. To attain the greatest advantages of the invention, the effects preferably should be of such a character that an electrical signal may be produced directly during reproduction, but this is not essential.

In Fig. 3 there is shown a section of 35 millimeter photographic film 71, for example, upon which is disposed a series of lines or effects 72 substantially parallel to the longitudinal axis. For easy reproducibility, the lines are shown dark and the surrounding film is shown transparent although the reverse, that is light lines with dark film may be used. Disposed on the film 71 along one side thereof, is a line of discrete marks 73, each mark of this line identifying the position of one particular row of data marks. The line 73 of marks may extend, for example, in the direction of film movement shown by the arrow.

Disposed at the opposite side of the film 71 from the line 73 of marks is a base line x—x which is an imaginary line shown coinciding with the first one of the parallel lines 72. Imaginary lines extending from each of the marks in line 73 and disposed at a predetermined angle, for example, at right angles to the base line x—x, define the positions of particular rows of data marks. For example, a line extending from mark 74 in line 73 at right angles to the base line x—x will intersect ten of the lines 72 beginning with line 75 and terminating with line 76, thereby indicating a total of 10 units in that piece of data. Immediately adjacent to mark 74, the mark 77 defines the position of the next piece of data, the data including the lines from the line 78 to the line 76. There are a total of 16 lines in this group and therefore 16 units in the data. This manner of indicating the data applies all along the film 76. In effect, the individual marks for each row of data have blended into single lines. Some forms of recording devices readily make records of this sort. For example, voltages may be supplied to a series of fingers which are in contact with recording paper sensitive to electrical current. The number of fingers energized at any one instant may then define the value of the data.

In Fig. 3, each of the lines 72 terminates abruptly and begins abruptly in order to define the marks applicable to a particular row of data. The lines themselves preferably are of uniform width and preferably uniformly spaced. While the lines are shown parallel and straight, it is to be understood they need not be straight but can be curved in a small amount as will become clear.

During the recording process, the film 71 moves in the direction of the arrow and appropriate lines indicative of the particular data values are made.

Corresponding to Fig. 2, each line in each row of data defines one unit in the data sample, there being no fractional values of data recordable. Consequently, the correct number of lines must be chosen in order to represent the desired accuracy in the recording process. The resolution inherent in the recording process is the same for the record of Fig. 3 as for the record of Fig. 2.

Within properly chosen limits of accuracy, the ends of the lines 72 define an outline which corresponds to the curve of the data being recorded. That is to say, the visual character of the original data is preserved as precisely as the chosen limits will permit.

The line 74 of marks is essentially a unitary time scale indicating the time when each data row is made. These marks are essential for this type of record in order to define the positions of the rows of data when either a slit of light or a flying spot of light is used for reproducing. The absence of data is indicated by the absence of any lines 72 as may be seen in the area 79. However, the marks 81 and 82 define the positions of zero data values in the area 79.

A total number of one thousand lines per inch may be made for a record of the type shown in Fig. 3 corresponding to the one thousand dots or marks which can be made on the record shown in Fig. 2.

In reproducing the record of Fig. 3, the film may be moved past a scanning point in the direction of the arrow and the film may be exposed through a slit by either a line of light or a flying spot of light. A photoelectric cell will pick up the transmitted light, and a series of pulses may be counted or an output voltage obtained corresponding to the total amount of light transmitted. Hence, a precise count of the data or a voltage analogue corresponding thereto is obtained.

The film may be moved as rapidly as the desired accuracy of calculations will permit and may be played back as rapidly as the record shown in Fig. 2.

In the case of Fig. 3, the record may be made on other media than photographic film similar to the record of Fig. 2.

While the rows of effects in Figs. 2 and 3 are disposed transverse to the direction of overall record movement, it will be understood that this is not essential. The rows of effects may be longitudinal so long as during the actual recording or reproducing operation the relative movements of the record and the apparatus are transverse to each other.

The records of Figs. 2 and 3 may be identified by legends which include the number of the record, the type of record, the date it was made, the place it was made and any other facts which are desirable or necessary. This information may be placed upon the records in any appropriate manner such as by photographing the actual hand-written information. Appropriate code systems may be used, for example such as dots or marks arranged according to a binary number system.

In Fig. 4 there is shown how the marks, according to the invetnion, may be utilized for identifying the record and giving the general information in regard thereto. Thus, the number of the record and the type of the record may be identified by an appropriate number of marks which have previously been assigned to the record and its type. The date may be given by a series of six rows of marks, the marks in the first row identifying the month, the marks in the second row identifying the day in that month, and the marks in the last four rows identifying the number of units in each of the digits giving the year. Likewise, the place at which the record was made can be identified by a number of marks as may be any other pertinent information desired on the record. The words written on the record of Fig. 4 are placed there to indicate what the different rows of marks mean and ordinarily would not appear on a finished record. So that they may be identified more easily, the rows of marks in the legend may be separated greater distances than the rows of data marks. The right-hand portion of Fig. 4 is a record of the same character as that shown in Fig. 3.

Figure 6:
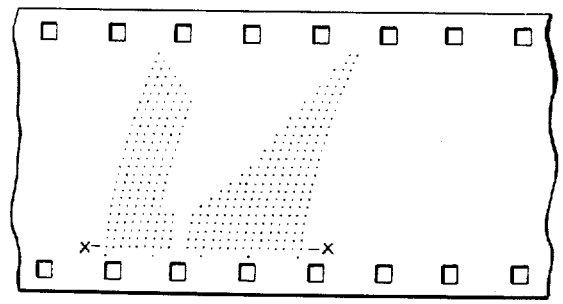
Figure 7:
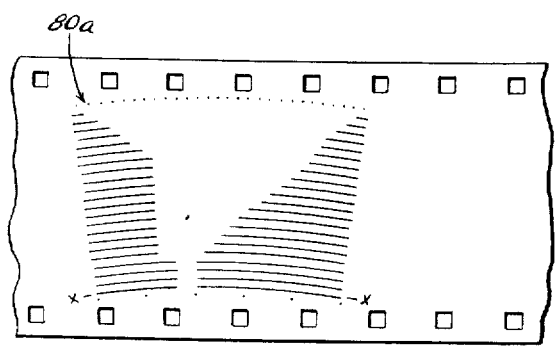

In Figs. 5, 6 and 7 are shown further forms of unitary records following essentially in the types illustrated in Figs. 2 and 3.

In Fig. 5 there is shown a form of record having substantially all of the characteristics of the form represented in Fig. 3. The prime difference between the records of Figs. 5 and 3 is that the imaginary lines extending from the line 80 of marks in Fig. 5 are slightly curved instead of being straight. With the slight curvature of the rows of data marks that is shown, the visual characteristics of the record remain essentially intact. The accuracy is the same as that of the record of Fig. 3. The curvature of the rows of data marks may be determined by following the outline of the ends of the parallel lines at either the left-hand end or the right-hand end thereof.

The record of Fig. 6 corresponds in type to that of Fig. 2 in that a series of separate or spaced rows of marks are utilized for defining the data values. The prime difference between the records of Figs. 6 and 2 is that the rows of marks in Fig. 6 lie along curved lines whereas the rows of marks in Fig. 2 lie along straight lines. The visual character of the data remains intact and the accuracy is the same as that of the record of Fig. 2.

The record of Fig. 7 is essentially that shown in Fig. 3 except that the base line x—x in Fig. 7 is slightly curved. Hence, the rows of data marks defined by the marks in line 80a are slightly divergent. Since the divergence is slight, the visual character of the original data is retained. All of the accuracy of the form of record shown in Fig. 3 is present in the record of Fig. 7.

Having the foregoing description of records in mind, the operation of a method and apparatus for recording data from a strip chart according to the invention may best be understood by considering Figs. 8 and 9 together. Figs. 10 to 16 also should be considered in connection with Fig. 9 in order to completely understand one manner of making a record. Fig. 8 illustrates the reader of a strip chart and may correspond to the reader 83 of Fig. 1 for reading the strip chart 50. The recorder of Fig. 9 may correspond to the unitary recorder 54 of Fig. 1 and the record of Fig. 10 may correspond to the record 56 of Fig. 1.

The apparatus of Fig. 8 comprises means for scanning the strip chart 50 with a spot of light and converting the data on the strip chart into voltage pulses which are utilized to record appropriate marks upon the record 84 of Fig. 9, record 84 corresponding to record 56 of Fig. 1.

The strip chart 50 may comprise a base material 85, such as paper for example, upon which there is a pre-printed grid of intersecting lines 86. Formed on the chart and grid is a line 87 which represents the data, the line having been made by an appropriate implement such as pen or pencil. Ordinarily, the pre-printed grid has some distinctive color and the line 87 is of some other distinctive color in order that the two may readily be seen relative to each other. The data represented by line 87 is the distance from the base line 88 to the line 87 along any one of the vertical grid lines and it is this distance which is converted by the apparatus into a representative number of pulses.

The strip chart is mounted upon a roll and shaft 89 and is moved either continuously or intermittently as desired by means of a sprocket 91, the used strip chart being taken up on a roll 92.

The sprocket 91 is driven by the drive motor 93 by means of a shift indicated by the broken line 90 and a variable speed reducer 94 in order that the strip chart 50 may be driven at any desired speed.

A mask 95 is disposed to overlie the strip chart 50, the mask obscuring the portion of line 87 which is to be read until the instant of reading. A spot of light 96 is directed onto the mask 95 and is caused to move from the bottom thereof to the top by means of a rotating mirror 97, the spot originating a suitable source of light 98. A pinhole provided in a disc 99 and a lens 101 form an appropriate image of the light spot on the mirror 97. The mirror 97 may be driven from the drive motor 93 through an appropriate connection illustrated by the broken line 102. The light spot 96 is reflected from mask 95 and by means of a further lens 103 and a narrow slit 104 an image of the light spot is formed upon a mask 105 which may be a transparent member having a series of uniformly spaced opaque lines thereon. The image of the light spot on mask 105 is focused by means of a further lens 106 into a photoelectric cell 107 through a color filter 108.

The slit 104 and the lens 103 are focused very sharply along the right edge of mask 95 so that only the image of the light spot 96 is passed through slit 104 and the succeeding apparatus. Since the mask 105 is transparent and has a series of opaque lines on it, the photoelectric cell 107 will receive illumination from the light spot interrupted by the opaque lines. Accordingly, the photoelectric cell 107 receives light pulses and provides electrical pulses corresponding thereto.

The color filter 108 is selected to prevent light of any color other than that desired from coming through. Particularly, light variations which may be due to the light spot 96 moving across the horizontal grid lines should be prevented since the horizontal grid lines on the strip chart have no meaning in this apparatus.

The space between base line 88 and line 87 is converted to a discrete number of pulses depending only upon the recording accuracy desired and does not have any relationship to the number of horizontal grid lines. The number of discrete pulses corresponding to the data, that is to the space between base line 88 and line 87, is determined by the number of opaque lines in screen 105 which are traversed by the reflected light spot as the light spot moves from base line 88 to the line 87. The full width of screen 105 and the opaque lines thereon correspond at least to the full width of the strip chart 50 and may be somewhat wider in order to allow for certain end effects. If the desired reading and recording accuracy is to be one-tenth of one percent there must be at least one thousand opaque lines. If the reading and recording accuracy is to be only one percent, the screen 105 must have at least one hundred opaque lines.

A second light spot 109 formed by the same light system 98, 99 and 101 is arranged to lie just off the right edge of mask 95 and operates to start and stop the creation of pulses. The light spots 96 and 109 might be a single short line of light created by a slit rather than two pinholes in the disc 91. The rotating mirror 97 causes the spot 109 to move along the surface of the strip chart at the right edge of the mask and thereby pass over the base line 88, the horizontal grid lines and the data line 87 at the same time the light spot 96 is moving on the mask and along the right edge thereof.

The light spot 109 passes across base line 88 and an effect therefrom is detected by the photoelectric cell 111 through the optical system including the lens 112, aperture 113, lens 114 and color filter 115. The lens 112 focuses an image of the aperture 113 upon the position of line 88 so that only when light spot 109 crosses line 88 does the photoelectric cell 111 receive an effect. The color filter 115 is selected to correspond with the color of base line 88 so that when the light spot 109 crosses line 88 the photoelectric cell 111 receives a spot of light but all other effects are excluded by means of the filter. The reception of the light pulse by photoelectric cell 111 is utilized to initiate the supply of discrete pulses to recording apparatus.

As the mirror 97 rotates the light spots 96 and 109 move upwardly across the strip chart and in so doing the light spot 109 eventually crosses the data line 87. At this instant the light spot 109 causes an appropriate effect in photoelectric cell 116 for turning off the supply of pulses.

The photoelectric cell 116 is supplied through an optical system comprising a lens 117, a slit 118, a lens 119 and a color filter 121. The lens 117 focuses the narrow slit 118 along the right edge of mask 95. Hence, as the light spot 109 moves upwardly along the right edge of the mask, a spot of light is continually observed by slit 118, the spot of light being focused by lens 119 on the photoelectric cell 116 through the color filter 121. The slit 118 observes the full extent of the right edge of mask 95 in order that the position of the data line 87 may be detected at any point within the confines of the strip chart. Ordinarily, the line 87 is of a color different than that of the underlying grid lines and frequently is of a heavier or lighter density. Any or all of these effects or others may be made use of in order to detect the position of the line 87. The density and color of the filter 121 will be selected in order to enable this detection to be made.

The generation of discrete pulses for one scan of the strip chart may now be described.

It is assumed that the driving motor 93 is operating and is causing the strip chart to move and the mirror 97 to rotate. The mirror has an appropriate number of flat faces on it and is arranged to rotate at a speed such that a complete scan across the strip chart is made while the strip chart itself moves a very short distance. To compensate for the slight movement of the strip chart during a scan, the upper end of the mask may be slanted a slight amount in the direction of record travel.

The light spots 96 and 109 begin their movement below the base line 88, as shown in Fig. 8, and in this starting position, the light spot 96 is reflected through screen 105 and into photoelectric cell 107. The photoelectric cell 111, however, receives no light spot through its associated optical system since the aperture 113 is focused onto the position of line 88. Thus as the light spots 96 and 109 begin moving, photoelectric cell 107 generates electrical pulses, these pulses being amplified by the unitary pulse amplifier 122 which may be of well known construction. The amplified pulses from amplifier 122 are supplied to a gate circuit 123 which also may be of a conventional construction. Gate 123 is closed and thus no pulses are passed therethrough until light spot 109 crosses base line 88. At this point the photoelectric cell 111 receives an impulse which is amplified by the start gate amplifier 124 and passed through the bias and clipper circuit 125 and conductor 126 to the gate 123. At this instant, the gate 123 is turned on by the pulse from photoelectric cell 111 and the pulses from photoelectric cell 107 are passed by the gate and are received at the terminal 127. The bias and clipper circuit is constructed along conventional lines to take into account the character of the pulses coming from photoelectric cell 111 in order that proper operation of the gate may be obtained. That is to say, extraneous pulses which should not operate the gate are prevented from so doing by the bias and clipper circuit. The color filter 115 eliminates certain extraneous effects and between it and the bias and clipper circuit 125 all of them may be eliminated.

As the light spots 96 and 109 continue to move upwardly, the pulses generated by photoelectric cell 107 continue to be received at terminal 127 until the light spot 109 crosses the data line 87. At this point the photoelectric cell 116 receives an appropriate signal as already described and supplies a pulse to the stop gate amplifier 128 which in turn feeds a pulse to a bias and clipper circuit 129. Consequently, a signal is supplied through a conductor 131 to gate 123 which causes the gate to close and cut off pulses from terminal 127.

The light spots 96 and 109 continue to move upwardly along the right hand edge of the mask 95 after the light spot 109 has crossed the data line 87, and pulses continue to be generated by photoelectric cell 107 but these do not reach terminal 127 since the gate is closed.

The flat surfaces of the mirror 97 have an angularity and area such that the mirror causes the light spots to sweep completely across the strip chart as well as a short distance on each side thereof. A synchronous pulse generator 132 is connected to the drive motor and operates to produce a single pulse for each scan of the strip chart, the pulses so produced being provided at the terminal 133.

There are no problems of registry or alignment in the aforedescribed reading process since pulses are supplied to terminal 127 only between the time the light spot 109 crosses base line 88 and data line 87. The scan distance remains the same irrespective of minor shifts in position of the strip chart itself, since the movement of the light spot across the chart is very rapid and shifts in chart position which might occur during the short interval of time are negligible.

The strip chart may be scanned many times between vertical grid lines and it may be desired to note on the final record made when the vertical grid lines move past the mask 95. Other time reference marks may exist on the strip chart and perhaps should be noted in the recording. For this purpose a further light spot 134 is projected onto the strip chart at the right edge of mask 95 and in line with whatever time reference marks on the chart are to be noted. If these are the vertical grid lines, the light spot 134 may preferably be just upwardly from the base line 88 so as to fall upon the vertical grid lines and yet so as not to interfere with the other light spots.

The light spot 134 is projected upon the strip chart by means of a light source 135, an aperture 136 and a lens 137. The reflection of light spot 134 is picked up by an optical system comprising the lens 138, aperture 139, lens 141, color filter 142 and photoelectric cell 143. Whenever one of the vertical grid lines or other time reference marks pass under the light spot 134, a change in illumination will be noted by the photoelectric cell 143 with the result that a pulse is received by the time reference pulse amplifier 144, the amplified pulse being then available at terminal 145. The aperture 139 is focused precisely upon the place where light spot 134 is projected and thus illumination from no other source reaches photoelectric cell 143. The color filter 142 is selected in order to enable the particular color of the vertical grid lines or time reference marks to be detected to the exclusion of other marks.

The optical systems of Fig. 8 are schematic and are not intended to define the precise number of components or their relative positions and the like, this being fully understood by those skilled in this art. For example, in instances wherein only one lens is shown, it will be readily understood that a system of lenses may be necessary to obtain the desired image. Likewise, the apparatus must be appropriately mounted in lightproof housings in order to prevent light from interfering with the operation.

The drive motor 93 may be operated from any suitable source of electrical power "S" connected thereto through conductors 146 and 147 and switch 148.

The data pulses generated by the reader of Fig. 8 are recorded by the apparatus of Fig. 9 upon the photographic film 84, the terminals 127, 133 and 145 of the reader being connected respectively to the terminals 127a, 133a and 145a of the recording apparatus shown in Fig. 9. The type of record to be made on film 84 is that shown in Fig. 3.

The photographic film 84 which may be 35-millimeter film for example, is mounted on a supply reel 149 and is taken up on a reel 151, the film (Fig. 8) being moved by means of a sprocket 152 whose teeth engage appropriately placed holes in the edges of the film. The sprocket 152 is driven by a motor 153 through a variable speed reducer, which reduces the drive motor speed to the proper value, and a stepping drive 155 which may be of the "Geneva" movement type is provided so that the sprocket may be moved in small discrete steps. The drive motor 153 is energized from any suitable source of power "S" through conductors 156 and 157 and switch 158. The stepping drive mechanism 155 is energized from the synchronizing pulses of the reading apparatus of Fig. 8 by means of conductor 159, a power supply and sweep control apparatus 161 and conductor 162. The actual energization of the stepping drive 155 may be any appropriate apparatus, such for example as the coil 163 energized through conductor 162.

The recording of pulses on the film is carried out by means of a mask 164 which is appropriately constructed and illuminated. Referring to Fig. 11 in connection with Fig. 9, the mask 164 is seen to have two series of openings 165 and 166.

The series of openings 165 is continuously illuminated by a band of light from a floodlight system comprising the light source 167, a slit 168 and a lens 169 which optical system provides a band of light illustrated by the broken lines 171 and 172, the thickness of the light band being determined by the width of slit 168 and being sufficient to completely illuminate the width of openings of series 165.

The series 166 of openings with the exception of the opening 173 is illuminated by a scanning spot of light according to the unitary method of the invention, the light spot being obtained from a cathode ray flying spot tube 174, for example, and the path thereof being shown by the broken lines 175 and 176. A lens 177 is provided if necessary. The opening 173 is illuminated by an optical system including the source of light 178, the aperture 179, the lens 181 and the mirror 182 controlled by the galvanometer coil 183.

The series 165 of openings in the mask defines the flood side thereof and may be designated by the reference character 184 and the series 166 of openings defines the record side of the mask and may be designated by the reference character 185 (Figs. 12–16).

In general, the operation of the recording system comprises continuously illuminating the series 165 of openings on the flood side 184 of the mask to form a series of opaque lines parallel to the longitudinal axis of the film strip are formed, and illuminating such of the series 166 of openings of the record side 185 of the mask to fill in a sufficient number of the parallel unexposed spaces between the lines to make the number of unexposed spaces between lines remaining equal to unitary representations of the successive data values.

The remaining structure of Fig. 9 and the operation of the recording system may be understood more completely by considering Fig. 9 in connection with Figs. 10–16, inclusive.

In Figs. 12 and 13 the mask 164 has been shown separated into two parts, the flood side part 184 and the record side part 185 for purposes of clarity. It will be understood that the mask may be so divided and used or it may be used together with the series 165 and 166 of openings disposed as close to each other as the optical conditions will warrant. With beam of light 171, 172 impinging on all of the openings in series 165, and the film 84 moving, and if the cathode ray tube 174 is unenergized, the resultant will be a section of exposed film as shown in Fig. 12. In this figure, the white lines 186 represent unexposed portions of the film which are under the opaque portions of the mask 184 and the dark lines 187 represent exposed portions of the film which are under the openings of series 165. The edges of the film are also exposed because the beam of light covers openings 188 and 189. The exposed portions of the film are shown dark since it is considered to be the ordinary photographic negative.

The number of openings in series 165, that is in the flood side 184 of the mask, is such that the number of unexposed or white lines 186 corresponds to the total number of effects which represent the full scale or maximum value of the data. If the recording accuracy is to be one-tenth of one percent, there must be one thousand white lines. If the recording accuracy is to be only one percent, the total number of white lines must be one hundred. In the sketches of Figs. 10–16, a very much reduced number of lines are shown in order to illustrate clearly the recording process.

Each of the openings, except openings 188 and 189 in series 165 is of the same size and are uniformly spaced in order to provide unexposed portions 186 of uniform width and spacing. The length of the openings 165 in the direction of film movement is not critical. It need be of a length such that the film is appropriately exposed when the intensity of illumination and the film speed movement are considered.

The openings of series 166 on the record side 185 of the mask are of the same width as the opening of series 165 and are disposed precisely opposite the opaque spaces of the mask lying between the openings of series 165. Accordingly, when the openings of series 166 are exposed to light, the lines 186 are exposed and became dark when the film is developed. The openings of series 166 are of uniform width and spacing also. The length of openings of series 166 may be chosen to give a size of mark desired and is arbitrarily shown in the drawings to be of a size such that an easily read record is obtained. The length should be equal to the amount of film movement for each data row.

At the upper end of the record side 185 of the mask there are two slits 191 with an opaque portion 192 therebetween, the total area being the same as that of any other openings in the series 166 for a purpose to become evident.

Referring to Fig. 10 there is shown a section of completed record made according to the designated apparatus and process, a portion of this section of the record being that to be described in connection with Figs. 12–16.

In Fig. 10 the section of film has been considered to be exposed and developed so that the portions thereof which have been exposed to light are shown dark and the unexposed portions are light. The row of white marks or dots 193 identifies the position of each row of marks corresponding to data. That is, for example, the first white mark at the left end of the film section defines the position of a piece of data having seven units, since there are seven lines thereunder. The next adjacent white mark defines the position of a row of data having six units since there are six white lines thereunder, etc.

The line of marks 193 is formed by means of the slits 191 and opaque portion 192 between them and the marks in line 194 are formed by the opening 173 which is smaller than openings 166.

In Fig. 12 the film is shown after it has been exposed under the flood side of the mask without data recorded thereon. Hence, the film, after passing under the record side of the mask, appears the same as it does after the flood side thereof.

In Fig. 13, a portion of the record side 185 of the mask has been broken away to illustrate the record after the first piece of data has been recorded, this being the portion of the film immediately to the left of the broken-away portion of the mask. That is to say, the first piece of data has been recorded and the film has been moved the proper distance for the next piece of data to be recorded. In recording the first row of data, the light spot from cathode ray tube 174 sweeps downwardly past the slits 191 and opaque portion 192 thereby forming the first mark in line 193. Since the first piece of data had seven units, the light spot traveled no further, thereby leaving seven white marks.

For the second piece of data, the light spot from cathode ray tube 174 moves across the mask with the film in the position shown in Fig. 13. The result is that the portion of the film between the broken-away portion of the record side 185 of the mask (Fig. 14) and that portion of the film to the left thereof may be seen in Fig. 13. This is the data for the second mark of line 193. In Fig. 14, the scanning spot of light moving past slits 191 and opaque portion 192 forms the second mark of line 193 for identifying the second row of data. The spot stays illuminated long enough to sweep past and illuminate the opening 197 of the record side of the mask thereby exposing the film thereof. Immediately thereafter, the light spot is turned off with the result that six white marks are left for the second row of data. For the third row of data, the light spot has moved across the mask portion 185 with the film in position shown in Fig. 14 and the resultant recording is shown in Fig. 15, it being that portion of the film between the broken-away portion of the mask portion 185 (Fig. 15) and the portion of the exposed film as shown in Fig. 14. In Fig. 14, the light spot has moved past the slits 191 and opening 198. The light spot is turned off immediately thereafter, thereby leaving five unexposed rows corresponding to a data unit of five. The light spot also formed the third mark in line 193 identifying the third row of data. Similarly, in Fig. 15 the light spot is allowed to move to expose opening 201 after which it is turned off thereby leaving four unexposed lines, meaning a data value of four units. This process is continued indefinitely for as long as there is data desired to be recorded.

With reference to the marks in line 194, the light from light source 178 is maintained on the opening 173 by the galvanometer 182 thereby exposing the film as it moves underneath this opening. Whenever it is desired to record a time reference mark, a time reference pulse is received by the galvanometer coil 183 which causes the mirror 182 to deflect the beam of light away from opening 173 with the result that the film at this instant is not exposed and a white mark is left.

Referring more particularly to Fig. 9, the cathode ray flying spot tube 174 may comprise a more or less conventional tube having a filament 203 providing a source of electrons, a control grid 204, and a sweep electrode 205 which causes the spot to deflect and therefore move across the recording mask. Power is supplied to the sweep electrode 205 from the power supply and sweep control circuits 161 through conductor 206. The power supply and sweep control circuit may be conventional apparatus so constructed that when a pulse is supplied thereto from synchronizing pulse input terminal 133a, a sweep voltage is applied to the electrode 205. Since a synchronizing pulse is supplied at the beginning of each scan of the strip chart shown in Fig. 8, the light spot from tube 174 is caused to scan across the recording film once for each data value to be recorded.

Voltage is supplied to the grid 204 of the cathode ray tube from a spot grid control circuit 207 which may be conventional apparatus. When a synchronizing pulse is received at the terminal 133a, that is, either at the beginning or end of a scan of the strip chart, the pulse is transmitted through conductor 159, conductors 208 and 209 to the spot grid control circuit thereby causing this circuit to supply voltage to the grid 204. This turns the cathode ray spot on, so to speak, at the same instant the sweep electrode 205 causes the spot to scan across the recording mask. When the cathode ray spot reaches the appropriate portion of the mask as will be subsequently described, a further signal is received by the spot grid control apparatus 207 through conductor 211 causing the spot grid control circuit to de-energize the grid 204, thereby turning off the light spot.

This latter apparatus may now be described.

It is not desired that the strip chart should stand still while a recording is being made of a particular data value which the strip chart reader has read. Accordingly, the recorder of Fig. 9 is provided with a memory apparatus whereby one value of data being read by the reader is stored while the previously read value is being recorded. The memory apparatus comprises a pair of counters 212 and 213, one of which is counting the pulses fed by the reader while the counts already stored in the other one are being recorded.

It may be assumed that the apparatus shown in Figs. 8 and 9 is operating and that the terminals 127, 133 and 145 of Fig. 8 are connected respectively to the terminals 127a, 133a and 145a of Fig. 9. At some particular instant, the light spot 96 of Fig. 8 will begin to move upwardly along the strip chart 50. At this instant the contact 214 is in the solid line position connecting the counter 213 to the terminal 127a through conductor 215 in Fig. 9. At this same instant the counter 212 is connected by means of the contact 216 (solid line position) to conductor 217 for a purpose presently to be described. Accordingly, as the scan of strip chart 50 continues, the pulses supplied by the reader are received only by counter 213 and are counted therein.

It may be supposed that the total number of pulses supplied for this particular value of data is 400 (scale of one thousand counters are shown in Fig. 9 since counters of this capacity are needed for a recording accuracy of one-tenth of one percent of full scale). After the reader has finished reading the first value of data and is about to begin the second value, that is, the light spots 96 and 109 are about to begin to move upwardly the second time, the synchronizing pulse generator 132 supplies a pulse indicating the beginning of a new scan by the reader. This pulse is supplied from the terminal 133a through the conductors 159, 208 and 218 to the scale of 2 counter 219. The reception of a pulse by the counter 219 causes it to energize the relay coil 221 thereby moving the contacts 214 and 216 from the positions shown by solid lines to the positions shown in dotted lines. Accordingly, the counter 212 is connected to conductor 215 and to the terminal 127a. Hence, the counter 212 now receives the data pulses from the reader corresponding to the second value of data and the counter 213 is connected to conductor 217.

While the counter 212 is receiving the data pulses corresponding to the second value of data, the number of data pulses already stored in counter 213 is recorded upon the film 84 as will be described. Recording the data stored in counter 213 occurs rapidly. The recording is completed and the counter 213 is cleared before the scan of the second value of data by the reader of Fig. 8 is completed. Hence, the counter 213 is ready and waiting to receive the pulses for the third value of data before the counter 212 has finished receiving the pulses for the second value of data. When the reader is about to begin the scan of the third value of data, the counter 219 receives a pulse as described thereby energizing the coil 221 and moving the switch arms 214 and 216 back to the positions shown in solid lines in Fig. 9. Hence, the counter 213 is connected as to receive data pulses and counter 212 is in a position to supply its value to be recorded.

By means of the synchronizing pulses received at terminal 133a, the reader and the recorder are maintained in synchronization. Some adjustment of the relative speeds of the strip chart 50 and the film 84 may have to be made in order to produce a uniform record in which the lines of data are uniformly spaced.

Consider now the recording of the data stored in counter 213. The receipt of the synchronizing pulse indicating the start of the second scan by the reader is supplied, through circuits previously described, to the spot grid control circuit 207 and to the power supply and sweep control circuit 161. Hence, the light spot from cathode ray tube 174 is caused to scan downwardly of the mask 164 as already described. The film 84, of course, is moving and has been exposed to the floodlight under the flood side of the mask as already described. Hence, as the spot moves downwardly of the mask 164, the openings 191 are illuminated, thereby causing the recording of a mark in line 193 establishing the position of that row of data.

The light spot from tube 174 continues to move downwardly and exposes the film under the openings 166. In so doing, the ends of the lines 187 (Fig. 13), are exposed, erased off so to speak (after the exposed film is developed). The light spot continues to move downwardly and exposes the openings 166 to light until the number of lines erased is equal to the complement of the number of pulses stored in counter 213. In the particular example given, in which the number of pulses stored in counter 213 is equal to four hundred, the number of lines remaining on film 84 for this value of data must be equal to four hundred. Since there are one thousand lines on the film to begin with, it is necessary to subtract off or erase off six hundred of them. That is to say, the film has the maximum number of lines needed on it and the recording apparatus erases off the difference between that maximum number and the number equal to the data value to be recorded, i.e. the complement thereof.

This is accomplished as follows: An optical system including the photoelectric cell 226 (Fig. 9), the slit 227, and the lens 228 is positioned so that light spots falling on the openings 166 are reflected into the photoelectric cell 226. Thus, when the openings 166 are illuminated by the lightspot from tube 174, the photoelectric cell 226 receives pulses of light and supplies voltage pulses to the counter whose stored value is being recorded. The pulses from photoelectric cell 226 are first amplified by a pulse amplifier 229, of conventional form, from which the amplified pulses are supplied to the respective counters through the conductor 217.

In the example being considered, that is where the data value stored in counter 213 is being recorded, the synchronizing pulse received at terminal 133a has caused the spot grid control circuit 207 to energize the tube 174 and has caused the power sweep control circuit 161 to energize electrode 205 of the tube 174, whereby the light spot is moving downwardly across the openings 191 and 166. When the spot hits the first of the openings 166, a light spot is seen by photoelectric cell 226 and a pulse is thereby supplied through the pulse amplifier 229, the conductor 217, contact 224 in dotted position, to counter 213. As the cathode ray spot moves to the next opening, the photoelectric cell 226 receives a further pulse which also is supplied to counter 213. This process continues until the counter 213 reaches its full scale value of one thousand pulses received. Four hundred of these pulses are those corresponding to the value of data (stored in counter) and six hundred correspond to those which are caused by the light spot moving across the openings 166 in the recording process (subtracted off from one thousand). When the counter 213 reaches its full scale value of one thousand pulses received, an output signal is generated thereby, which is fed through conductor 211 to a spot grid control circuit 207 which instantaneously denergizes the grid 204, that is, it turns off the tube 174. The voltage on electrode 205 may continue through its sweep cycle but no further effect is obtained since the grid 204 is de-energized.

The counter 213 as well as the counter 212 is so designed, as is well understood, that no output signal is given, thereby until the counter reaches full scale. In this manner the counters are self clearing and no special circuit need be provided for this purpose after a recording of its stored data value is made. For each recording scan by tube 174, the light spot is allowed to illuminate the openings 166 until the particular counter reaches full scale. After a counter reaches full scale, it remains at rest until a further synchronizing pulse is received, whereupon the other counter is connected so as to receive pulses from the recording scan while the particular counter receives data pulses. In successive scans in which the ends of the lines 187 (Fig. 12) are erased off, a pattern such as is shown in Fig. 10 is made.

The data recorded, according to the preceding paragraphs is of transverse unitary form, that is, a discrete pulse was had for each unit in the data.

A data-processing system in accordance with this invention must also accept data in analogue form for the record to be of universal character. Data in this form may be recorded initially according to the invention. Referring to Fig. 1, the instrument 53 may sense the data as a voltage which is supplied to a transverse unitary recorder 54. For recording in transverse unitary form from analogue data, the apparatus disclosed in Fig. 17 should be referred to in connection with the apparatus shown in Fig. 9. In essence, recording data in analogue form is carried out, according to the invention, by using a line of light, created by a mirror galvanometer, to terminate the ends of lines on the photographic film made as already described.

In Fig. 17, which, in general, is an illustration on a larger scale with certain modifications of apparatus shown in Fig. 9, the same reference characters are applied as used in Fig. 9 for corresponding parts. Thus, in Fig. 17 the photographic film 84 is moved from reel 149 to reel 151 in the direction of the arrow by the same apparatus as is shown in Fig. 9. Alternate lines of exposed and unexposed film are made by the optical system 167, 168 and 169 (Fig. 9) cooperating with the openings 165 in mask 164'.

Mask 164' is essentially the same as mask 164 with some differences to be pointed out. Mask 164' has openings 166 disposed as already described for mask 164. The openings in mask 164', however, are adapted to be illuminated by a mirror galvanometer 231. The galvanometric elements 232 and 233 may be suitable coils which are energized from the input data voltages through amplifiers 234 and 235. The position of the galvanometer mirror 236 is determined by the energization of the elements 232 and 233. A suitable source of light such as a bulb 237, a lens 238, and a slit 239 may be provided for producing a band or line of light projecting upon the mirror 236 which in turn reflects the band of light upon the openings 166. The galvanometer mirror 236 has two extreme positions of movement; one shown by the dotted line in which none of the light falls upon openings 166, and a position shown by a solid line in which all of the openings are illuminated. The number of the openings 166 which are illuminated depends upon the position of the mirror 236 and is a function of the energization of elements 232 and 233, that is, of the data values supplied thereto. The mirror 236 remains in any one position so long as the data voltage supplied thereto remains the same.

The instrument records the data value directly rather than by the complementary method described previously. That is, the mirror 236 normally occupies the position shown by the solid line thus illuminating all the openings 166 and causing all of the lines to be erased off. One limit of the line of light is shown by the dot-dash line 241 and the other limit is shown by the dot-dash line 242. As data values are received by the galvanometric element, the mirror 236 moves toward the broken line position, thereby moving the dot-dash line 241 toward the left (Fig. 17) until in the position corresponding to maximum data; the line of light is shown by the dot-dash line 243.

Only one galvanometric element need be used if only one value is to be recorded. Two elements or more may be used when the product of two quantities is desired.

Since the film 84 is a record of the type shown in Fig. 3, unitary time pulses 73 must be recorded in order to identify the positions of values of data. These pulses are shown in Fig. 17 by the line 193 of light marks. These marks are made by an optical system comprising a bulb 244, a small aperture 245, and a lens 246. The bulb or flash lamp 244 is energized by a flash lamp power and control circuit 247 of well known form which is energized by a timer or synchronizing pulse generator 248, the latter supplying timing pulses at regular intervals. The flashes from flash lamp 244 fall upon the opening 191' in the mask and thus expose the film for each data value. Opening 191' may be smaller than openings in series 166 so that an unexposed part of the film remains to make the light mark desired.

In order to keep the light reflected from the mirror 236 from illuminating opening 191', a baffle 251 may be disposed upwardly from mask 164' sufficiently far so as to shield opening 191'. If time reference marks are desired, the galvanometric and optical system 178, 179, 181, 182 and 183 may be used as already described in connection with Fig. 9.

After a recording (unitary or analogue) is made as described, it may be reproduced or played back, according to the invention, as shown in Fig. 18. In this figure, the photographic record 84 is moved from a storage reel 252 to a take-up reel 253 by a suitable drive motor 254. The drive motor is connected through a variable speed reducer 255 and/or a stepping drive 256 to the sprocket 257 for driving the film. A manual drive 258 may be connected to the drive system so that the photographic film may be driven manually if desired. A mask 259 is disposed overlying the film so that illumination supplied from either a spot source or a beam source is limited to the length of the film corresponding to one row of data. For the mask 259 to cooperate with the record made according to Fig. 9, the length of the openings in the direction of film movement is the same as the length of the openings 166 in mask 164.

If the record 84 is to be played back by the analogue method, that is if the value to be derived therefrom is a voltage corresponding to the data value, a beam of light formed by the lamp 261, slit 262 and lens 263 is projected upon the photographic film through the mask 259. The amount of light permitted to pass by the number of unexposed or white lines on the film will fall upon the photoelectric cell 264 through the optical system including lens 265, a slit 266 and a lens 267. The photoelectric cell 264 produces a voltage proportional to the illumination, which voltage may be amplified by the analogue amplifier 268 whereupon it may be measured by an instrument 269 or it may be supplied to any other apparatus from terminal 271. If individual values of data are to be observed, the film, of course, moves slower and may be moved by means of the manual drive. If the data values are to be re-recorded or supplied to rapidly moving computing apparatus, the film, of course, can be driven much faster.

The light from source 261 also illuminates the light spots in line 193. The light pulses therefrom are picked up by the photoelectric cell 272 through an optical system comprising a lens 273, aperture 274 and lens 275. Since the slit in mask 259 spans across the light spots in line 193 at the same time that it spans across the rows of data, a pulse will be received by the synchronizing pulse amplifier 276 for each value of data played back. The beam of light from lamp 261 also provides a pulse in photoelectric cell 277, whenever a time reference mark in line 194 comes under the slit in mask 259. An optical system including the lens 278, an aperture 279 and a lens 281 directs the light from these light spots to photoelectric cell 277. The voltage pulses from photoelectric cell 277 are fed to the time reference pulse amplifier 282 to be used in subsequent recordings.

The drive apparatus shown in Fig. 18 as well as the optical system extending from the light 261 may be the same apparatus as shown in Fig. 9.

If the data on photographic film is to be played back unitarily, a cathode ray tube 283 may be used as a flying spot scanner. This tube, its power supply and sweep control circuit 284 and the spot grid control 285 may be essentially the same as the corresponding elements shown in Fig. 9.

The light spot from tube 283 is projected by means of a lens 286 upon the slit in mask 259 and is caused to scan or move thereacross by means of the sweep control circuit. The opaque portions of the film will prevent transmission of light whereas transparent portions of the film will transmit it. The transmitted pulses of light will be picked up by photoelectric cell 264 through its associated optical system and its pulses will be supplied to the unitary pulse amplifier 287, the switch 288 being in the dotted line position. The number of pulses received for each scan may be indicated by an instrument 289 which may be a counter thereby giving the actual number of pulses; that is to say a completely accurate count. The pulses may also be supplied from terminal 291 to computing on other recording apparatus.

The film may be driven at any speed consistent with being able to detect the number of pulses for each scan. Thus, if the reading of the data is to be a visual observation of instrument 289, the film will be moved slowly; on the other hand if the computing apparatus, for example, to which the pulses are to be supplied is capable of operating rapidly, the film may be moved more rapidly. A synchronizing pulse generator 292 may be driven by the drive motor so that pulses are supplied through conductor 293 to the power supply and sweep control circuit 284 and the spot grid control circuit 285 for each position of data on the record. It is assumed that the initial recording was made sufficiently accurate so that the rows of data are uniformly spaced from each other. The flying spot from tube 283, of course, illuminates the light spots in row 193 whereupon synchronizing pulses are received by the amplifier 276. Thus, by counting the number of pulses from any beginning point in the playback process, the operator is able to determine the particular value of data he is observing.

The time reference light spots in row 194 may be illuminated by an opening 290 in a mask 300 which may be placed in front of lens 263 for preventing illumination of the flood light from reaching the photographic film while the film is being played back unitarily. The time reference pulses are, of course, received by amplifier 282 as already described.

The data on photographic film 84 may also be interpreted visually merely by looking at the film and observing the outline of the longitudinal transparent lines and each specific value of data may be evaluated visually by counting the number of lines at any transverse position. A magnifying viewer for this purpose may be used if desired.

In Fig. 19 there is shown a unitary recorder corresponding to the unitary recorder designated as 54 in Fig. 1 for making a record of the form 55. The recorder of Fig. 19 is adapted to cooperate with the strip chart reader of Fig. 8 for recording data on the strip chart 50 onto the unitary or universal record 55. The unitary pulse output terminal 127, the synchronizing pulse output terminal 133, and the time reference output pulse terminal 145 of the strip chart reader (Fig. 8) are connected respectively to the terminals 127b, 133b and 145b of the recorder of Fig. 19.

The recorder records on paper for example, by utilizing a tapper bar 295 to force an inked ribbon 296 against the recording medium (or vice versa) and a rotating cylinder 297 for determining how many marks are made for each operation of the tapper bar. The record 55 moves in the direction of the arrow under the influence of a sprocket 298 whose teeth engage openings in the recording medium. The sprocket 298 is actuated with each operation of the tapper bar 295 so that the record 55 is moved an equal amount for each operation. The rows 299 of marks correspond to the rows 66 of marks on the photographic film 65 of Fig. 2. The record 55 of Fig. 19 corresponds in form to the record of Fig. 2. The medium of record 55 is taken from a supply reel 301 of blank material and is taken up on the reel 302 by a suitable apparatus. The blank medium moves directly over the cylinder 297 so that when the tapper bar 295 is actuated, the blank medium is forced into engagement with the surface of the cylinder and the inked ribbon.

The surface of the cylinder 297 consists of a series of ridges 303 parallel to and uniformly spaced from each other (Fig. 20). The tops of the ridges preferably are of the same configuration and may be flattened so that the marks made upon the recording medium are of uniform shape and spacing. Reference should also be made to Fig. 22 in which the cylinder 297 is shown in developed form. The ridges 303 are of different lengths and vary in length from one unit at the upper end of the cylinder to full length, that is completely surrounding the cylinder, at the lower end. Each of the ridges 303 begins at the same element of the cylinder and extends around the cylinder a sufficient distance determined by its length. Accordingly, the ends of the ridges 303 terminate along a diagonal of the developed cylindrical form. It will be apparent, when viewing Fig. 22 that, if the tapper bar 295 of Fig. 19 comes down at the initial position of the cylinder, the full number of marks will be made and if the tapper bar comes down at the end of the cylinder (right edge of Fig. 22) no data marks will be made. In between these two positions, a number of marks will be made which corresponds linearly to the rotative position of the cylinder.

The number of ridges 303 corresponds precisely to the full scale accuracy desired in the data record. If the accuracy is to be one-tenth of one percent, one thousand ridges will be on the cylinder 297 and if the accuracy is to be only one percent, there are only one hundred ridges 303. In Figs. 19 and 22, fifty ridges 303 are shown by way of example. There are two ridges 304 and 305 at the lower end of the cylinder (Fig. 22) which extend completely around the cylinder for a purpose to be described. At the upper end of the cylinder, there are a series of gear teeth 306 for driving a pulse generator 307. Also disposed at the upper end of the cylinder is a small projection 308 for closing a switch to be described.

Referring to Fig. 19, the cylinder 297 is driven at substantially constant speed by a suitable motor 309 energized from a source of electrical energy 311.

The tapper bar 295 is mounted by any suitable mechanism such for example as a pair of bars 312 and 313 pivoted on a shaft 314, the shaft being mounted in appropriate bearings as shown. Pivoted to the bar 313, beyond shaft 314 from tapper bar 295 is a bar 315 forming the movable core inside of a coil or solenoid 316. The solenoid, whene energized, causes bar 315 to move upwardly thereby pivoting the tapper bar 295 about the shaft 315 and causing it to move downwardly. When the solenoid 316 becomes de-energized, a spring 317 attached to the tapper bar 295 causes the tapper bar mechanism to return to its inoperative position as shown in the drawing. Also pivoted to the arm 313 is a toothed ratchet bar 318 held in engagement with a toothed wheel 319 by a spring 321, the bar 318, toothed wheel 319 and the spring 321 comprising a ratchet mechanism. The teeth of the ratchet mechanism are so disposed that when the tapper bar 295 moves downwardly, the teeth on the bar 318 slip over those on the wheel 319 without causing movement thereof. However, when spring 317 returns the tapper bar 295 to its inoperative position, the teeth on the bar 218 engage those on the wheel 319 and cause the ratchet wheel 319 and the sprocket 298 to rotate clockwise, thereby moving the record medium 55 toward the left as shown by the arrow.

The tapper bar 295 is of a length to cooperate with all of the ridges 303 and the ridge 304 on cylinder 297. Disposed adjacent the lower end of the tapper bar mechanism is a further tapper bar 322 pivotally mounted upon the shaft 314 by means of an arm 323. At the end of arm 323 and pivotally connected thereto is a bar 324 forming the core of a coil or solenoid 325. When the coil 325 is energized, the tapper bor 322 is caused to move downwardly and when the coil is de-energized, the tapper bar 322 is moved to its inoperative position shown in the drawing by a spring 326. The tapper bar 322 cooperates with the ridge 305 on cylinder 297.

With the foregoing apparatus in mind, the remaining apparatus of the recorder of Fig. 19 and the operation thereof may be considered together.

It is assumed that the strip chart reader of Fig. 8 is ready to operate and the terminals 127, 133 and 145 thereof are connected to the terminals 127b, 133b and 145b (Fig. 9) resepectively, of the recorder. The cylinder 297 is assumed to be rotating at its normal and substantially constant speed. In so doing, the pulse generator 307 is generating pulses. One pulse is generated for each one of the ridges 303 during each revolution of the cylinder. That is to say, in the particular Figs. 19 and 22, the generator 307 will generate fifty pulses for each revolution by the cylinder 297. If the cylinder has one thousand ridges on it, then the generator 307 will generate one thousand pulses for each revolution, and so on. This has been illustrated in Fig. 22 by showing the gear teeth 306 equal in number to the ridges in 303 and uniformly spaced around the cylinder.

It is assumed that the strip chart reader of Fig. 8 has completed its first scan and during this scan has produced twenty pulses which are supplied from terminal 127b through conductors 327 and 328, closed contact 329 to counter 331 (counter 331 is shown as a scale of a thousand counter since this represents a preferred form of an overall apparatus even though in the particular disclosure of Figs. 19 and 22 only fifty ridges, for example, are shown on the cylinder 297).

The counter 331 is of the full scale readout type in the same manner as the counter 212 of Fig. 9. That is, an output signal is obtained only when the counter has received its full scale of counts. With the particular apparatus shown in the drawings, this would be fifty pulses. Hence, counter 331 remains as it is with only twenty pulses on it. As the reader of Fig. 8 begins its second scan, a synchronizing pulse is received at terminal 137b and is supplied to the scale of 2 counter 332. This causes the coil 333 to be instantaneously energized thereby causing the contact 329 to move to the position shown dotted and the contact 334 to move to its position shown dotted. The pulses of the second scan of the strip chart reader are now supplied to counter 335 from terminal 127b, conductors 327 and 336, and contacts 334 in the dotted position.

It is assumed that the second data value from the strip chart also comprises twenty pulses. When the coil 333 is energized by the scale of 2 counter 332 receiving a pulse, that is at the beginning of the second scan by the strip chart reader, the armature 336 is caused to move upwardly so that the protuberance 337 (also Fig. 21) causes the contact 338 to close its circuit. Now, when the cylinder 297 reaches the initial position as shown in Fig. 19, the protuberance 308 causes the contact 339 to close its circuit. At this instant a circuit through the coil or solenoid 341 is produced as follows: From a source of voltage B+ through conductor 342, closed contact 339, conductor 343, closed contact 338, conductor 344, through coil 341 to ground. Energization of coil 341 causes the contacts 345 and 346 to close. Closing contacts in 346 provides a hold-in circuit for coil 341 as follows: From the source of voltage B+ through conductor 347, closed contact 346, through conductors 348 and 343, closed contact 338, conductor 344 and coil 341 to ground. Hence, when the cylinder 297 moves away from its initial position and contact 339 opens, the coil 341 remains energized. Closing contacts 345 supplies the pulses from pulse generator 307 to counter 331 (causing recording of the first data value stored in this counter during the counting of the second data value by the strip chart reader and supplying thereof to counter 335).

In the initial position of cylinder 297, that is at the instant of closing contacts 339, the pulses begin to flow from pulse generator 307 to the counter 331 through a circuit which may be traced as follows: From generator 307 through conductor 349, closed contacts 345, conductors 351 and 350, and contact 329 in the dotted position to counter 331. It will be noted that if the tapper bar 295 were to come down with the cylinder 297 in its initial position as shown, it would come down on all of the ridges 303. This would be the condition for zero value of data since the method of recording by the apparatus of Fig. 19 utilizes the complement of the data value. That is, since the counters give a signal only when full scale is reached, the recording apparatus will record or print only when an additional number of pulses equal to the complement of the number of data pulses is supplied to the counter. In the initial position of the cylinder, the tapper bar would, however, cause the record to engage the ridge 304, thereby printing one mark in the line of marks 352 which identify the positions of the rows of data as pointed out in connection with Fig. 2. As the cylinder 297 continues to rotate, a pulse is generated as each of the ridges 303 comes into position along the initial line or recording line. Since the counter 331 has a count of twenty pulses in it, this being the value of the data, it is imperative that the tapper bar come down when twenty of the ridges 303 are in the initial line, that is in a position to print. This means that thirty pulses must be generated by generator 307 and supplied to the counter 331 through the circuit described, since the counter 331 will give a readout signal only when its full scale, that is fifty pulses, are received by it.

The generator 307 will have generated thirty pulses when the cylinder 297 has rotated three-fifths of a revolution in the counterclockwise direction. With the ridges 303 placed on the cylinder 297 as shown, three-fifths of a revolution of the cylinder brings twenty ridges into the initial line, that is in position to be engaged by the tapper bar.

When the additional number of thirty pulses has been supplied to the counter 331, its readout signal is supplied to the grid of the tube 353 through the conductors 354 and 355. The tube 353 may be a tube of the thyratron type whereupon the receipt of the pulse from the counter causes the tube 353 to fire and supply a pulse of current to the coil 316 through the following circuit: From a source of D.C. voltage through closed contacts 356, conductor 357, coil 316, conductor 358 and through tube 353 to ground. The current in coil 316 energizes this coil and causes the tapper bar to come down to force the blank record into engagement between the printing ribbon 296 and the appropriate number of ridges 303. At the instant of movement of the tapper bar 295, the end thereof causes the contact 338 to open thereby breaking the hold-in circuit of coil 331 and causing the contacts 345 and 346 to open. This interrupts the flow of pulses from the pulse generator 307 to the counter 331. Also, movement of the tapper bar 295, near its lower limit, causes the contacts 356 to open thereby interrupting the power circuit of the tube 353 and de-energizing the coil 316. Accordingly, the tapper bar moves up into the inoperative position. While the tapper bar was down, it not only engaged twenty of the ridges 303 but it engaged the ridge 304 and caused a mark to be made in the line 352.

The recording apparatus is now in a position to record the next succeeding value of data.

It is assumed that the counter 335 is receiving a data count of twenty pulses while the recording of the data in counter 331 is being carried on. At the instant of beginning the third scan by the strip chart reader, the counter 332 receives a pulse and energizes the coil 333 thereby moving the contacts 329 and 334 back toward the solid line positions. Accordingly, the third data value pulses are being supplied to counter 331 and the counter 335 is connected by means of conductor 359 to conductor 351 and ultimately to the pulse generator 307. This energization of coil 333 causes the armature 336 to move downwardly whereby the prong 361 (also Fig. 21) causes the contacts 338 to close. At this time the cylinder 297 may be in any except the initial position and contacts 339 will be open. However, when the cylinder moves into the initial or start position, contact 339 will close thereby completing a circuit to coil 341 as already described. The hold-in circuit for this coil will also be completed as already described. Consequently, the circuit from pulse generator 307 to conductor 351 and the counter 335 is complete. When this counter reaches full scale, that is, when it has received thirty additional pulses due to a rotation of three-fifths of a revolution of cylinder 297, tube 353 will receive a firing impulse with a result that the tapper bar moves down and prints twenty marks on the record 55. The de-energization of the tube takes place in the manner already described and the printing process may continue as long as desired.

In order for the recording to keep up with the scanning speed of the strip chart reader, it is necessary for the cylinder 297 to rotate at a speed such that it can complete two full revolutions during one scan of the strip chart. Then it will make no difference in what position of the cylinder 297 the counters 331 and 335 finish receiving data pulse since the cylinder will be able to complete that revolution and the recording revolution before the strip chart begins another scan. The use of two counters 331 and 335 is a memory scheme in order that one value of data may be scanned and held while another is being recorded. In this manner more rapid operation is obtained. Of course, other memory systems may be used.

The outline of the rows of dots shown on the record 55 in Fig. 19 is a visual picture of the original strip chart graph, the value of the data being represented by the number of marks in each row. With properly constructed apparatus, the size and shape of the marks as well as their spacing in each row and the spacing between rows are substantially the same and uniform.

If time reference marks are desired on this record, a pulse is supplied from the strip chart reader to the terminal 145b. The pulse is then supplied through conductor 362 to the grid of a tube 363, this tube being of the thyratron type. When a pulse is received by tube 363, it fires thereby providing a pulse to coil 325 through a circuit which may be traced as follows: From a source of D.C. voltage B+ through closed contacts 364, conductor 365, coil 325, conductor 366 and through tube 363 to ground. Energization of coil 325 causes the tapper bar 296 to move down thereby, in effect, engaging the ridge 305 and making a mark in line 367. When the tapper bar 296 approaches its lowermost position, it causes the contact 364 to open interrupting the circuit of tube 363 and restoring it to its non-firing position.

The record 55 after being made by the apparatus and method of Fig. 19, may be reproduced or played back by the reproducing apparatus of Fig. 18, the record 55 replacing the photographic film 84. The mask 259 would have a slit of appropriate length so as to include one row of unitary marks 299. To play back the record 55 by the analogue method, the beam or floodlight apparatus 261, 262 and 263 would be used and to play back the record by the unitary method, the cathode ray flying spot scanning tube apparatus 283 is used.

When using the analogue method, the total amount of light passing through the record and falling upon the photoelectric cell 264 is determined by the number of dark marks or dots and if the record is reproduced by the unitary method, the photoelectric cell 264 receives impulses equal to the number of marks or dots on the record. The record is visual since the outline formed by the ends of the rows of marks is essentially the same as the shape of the curve from which the data were taken and the reproduction may be by either the analogue or unitary technique.

From the standpoint of visual or manual reproduction of the record 55 in Fig. 19 some difficulty may be experienced, if the accuracy of recording is high, for example, one-tenth of one percent. The visual and manual reading or reproducing of such records may be facilitated by modulating the record as may be seen in connection with Figs. 23 to 28. Referring first to Figs. 23 and 24, Fig. 23 represents a developed form of a cylinder 368 similar to the cylinder 297. The difference between the developed forms of cylinders 297 and 368 is that every fifth and every tenth ridge of cylinder 368 have their crests wider than the remaining ridges and every tenth ridge has its crest wider than every fifth ridge, while in the cylinder 297 the crests of all ridges are alike. The first two ridges of cylinder 368 correspond to the ridges 304 and 305 of cylinder 297 and do not enter into the grouping.

Utilizing the cylinder 368 will result in a record of a form illustrated as record 369 in Figure 24 and shown directly opposite the cylinder so that correspondence between the lines of marks and ridges which form them can be seen. This record may be referred to as being density modulated since certain of the marks are more dense than others. Since every fifth and every tenth row stand out from the others, it is evident that it will be easier to manually count the number of marks in any row. The manual and visual usefuless of the record are thus enhanced.

Reproducing the record 369, for example, by the apparatus of Fig. 18 does not introduce any difficulty. If the record is being reproduced by the unitary method (flying spot scanning) no errors or difficulties of any sort are introduced since the photoelectric cell 264 will receive the same number of pulses irrespective of the variation in the dimensions of the marks. If the record is to be reproduced by the analogue method, some minor adjustment of the apparatus is necessary in order to produce the correct result since the amount of light falling upon the photoelectric cell 264 is determined by the total amount of light transmitted by the record and this, of course, is varied if the dimensions of the opaque marks are varied. The adjustment to be made to the apparatus such as to the amplifier connected to the photoelectric cell is simple and well understood.

Referring now to Figs. 25 and 26, there is shown a developed form of cylinder 371 and a record 372 which is of the form that can be made by the cylinder 371. The record 372 may be referred to as being space modulated since the spacing between certain marks differ from the spacing between other of the marks.

The cylinder 371 is similar to the cylinder 297 except that the ridges of cylinder 371 are arranged in groups of five and ten ridges respectively. The space between the groups of five ridges is wider than that of individual ridges and the space between groups of ten ridges is wider than that between groups of five ridges whereas in cylinder 297 the ridges are equally spaced. The first two ridges of cylinder 371 correspond to the ridges 304 and 305 of cylinder 297 and do not enter into the grouping.

The record 372 is shown directly opposite the cylinder 371 so that correspondence between the lines of marks and the ridges which form them may be seen. The wider spacing and the still wider spacing between the groups of five and ten marks make the record 372 simpler to read manually and visually since the groups of ten and five may be counted first thereby making it necessary only to specifically count the units in the last group of less than five.

The record 372 would be played back by the apparatus of Fig. 18 with no difficulty. If the unitary method is to be used, the photoelectric cell 264 will receive the same number of pulses even though the spacing between some pulses and others differ. Some minor adjustment, as already pointed out in connection with record 369, may have to be made if the analogue method is to be used, since the total amount of light falling upon the photoelectric cell 264 could be different with the record 372 than with record 55 of Fig. 19 due to the wider spaces between certain marks. This adjustment, however, is simply made.

In Figs. 27 and 28 there are shown records 373 and 374 respectively, these records being density and space modulated similarly to records 369 and 372.

The records 373 and 374 are of the form shown in Figs. 9 and 18, in which parallel lines are made and the number of lines at any position determine the data value. The records 373 and 374 may be made for example, by the photographic process already described in which the masks used during recording have openings of appropriate size and spacing. That is, the openings are of a size to form lines of varying density and are spaced to produce different spacing between groups of five and groups of ten lines.

With the foregoing description of structure and methods in mind, for a fuller understanding of the invention, reference may be had to Fig. 1. The descriptions of Figs. 8, 9, 18 and 19 disclose how original data on a strip chart may be converted into transverse unitary records and reproduced so as to provide direct visual, manual and automatic reading of the data. The description of Fig. 18 discloses how in the playback or reproduction of unitary records either unitary or analogue voltage signals are obtained, in Fig. 18 these signals being respectively obtained at terminals 291 and 271.

The voltage signals whether of the pulse (unitary) type or of the analogue type are well understood and may be supplied to tabulating or card punching apparatus or graphical, that is curve tracing apparatus, in a well known manner for reducing the data to a written form as is diagrammatically illustrated by the block diagrams designated by the reference characters 59 and 61. Deriving tabular, punched or other graphical records from unitary or analogue voltage signals is believed within the skill of the art and need not be specifically illustrated.

The structure of Fig. 17 utilizes an analogue voltage input signal (apparatus 53, Fig. 1) and provides a transverse unitary record which may be reproduced visually, manually or automatically by the apparatus of Fig. 18 to provide unitary or analogue signals from which the data may be reduced to writing as indicated in connection with the strip chart apparatus. The pulses provided by apparatus 52 of Fig. 1 may, for example, be similar to that disclosed in the application Ser. No. 165,844 previously referred to. The data indicated by these pulses are of the same character as provided by the strip chart reader and thus recording and reproducing may take place in the same fashion as already described.

After the transverse unitary records of the types 55 and 56 are made, reproductions therefrom may be made as rapidly as the succeeding apparatus will permit. If the tabulating, punching or curve tracing apparatus is fast, the records may be reproduced fast. Delays which occur do not lie with the reproducing apparatus as such.

With the data recorded in transverse unitary form on photographic film, the particular samples of data desired may be in the middle of a long strip of film and it may be that a particular roll of film upon which the desired data exists is not known. In these instances, it is necessary to run off a substantial amount of film in order to find the desired data. That is of no special disadvantage, according to the invention, since the film may be run very rapidly through the reproducer and the code number or other designation of the particular data and the unitary marks identifying it may be noted and observed by the reproducing apparatus.

After the data has been recorded in transverse unitary form, computations or analyses thereof may be made in connection with the reproducing apparatus and further transverse unitary records made of the computations, or the computation may be reduced to written form as shown by the graphic recorder 63 and the tabular or punched card apparatus 64 shown in Fig. 1.

In Fig. 29 there is illustrated reproducing and computing or analyzing apparatus from which differences between data values spaced apart by specific time intervals may be obtained. In this apparatus, the different values may be obtained either in terms of an analogue voltage or in terms of pulses, that is unitarily. Fig. 29 may be considered in connection with Fig. 18, corresponding parts in these two figures bearing the same reference characters. With the exception of the mask 375 and some minor differences in the cathode ray flying spot scanning tube 376, and the flood light system beginning with lamp 377, the apparatus of Fig. 29 may be substantially that of Fig. 18.

Assuming that the unitary record 84 to be reproduced and analyzed in Fig. 29 is the same record 84 of Fig. 18, it is assumed that computation to be made in Fig. 29 is to find the difference between the pieces of data spaced six time units apart, that is for example, between the marks 74 and 81 as observed in Fig. 3. To achieve this, the mask 377 has two slits in it, 378 and 379, spaced apart by a distance equal to six units. If the computation is to be achieved by the unitary method, the cathode ray flying spot scanning tube 376 is used with a spot having a sufficient width to span across the slits 378 and 379 as indicated by broken lines projecting outwardly from the tube 376. Two tubes, each supplying a smaller flying spot, could of course, be used. Spaced behind the record 84 and focused on the slits 378 and 379, by means of an appropriate optical system, are two photoelectric tubes 381 and 382. Each of the photoelectric tubes 381 and 382 receives the number of pulses applying to its particular rows of data being scanned at the particular instant. These pulses may be supplied to the unitary pulse amplifiers 383 and 384 by having the switches 385 and 386 in the solid line positions. The amplified pulses from amplifiers 383 and 384 may be subtracted (or added if desired) by appropriately connecting the amplifiers to a counter 387.

If the difference (or sum) of the data values is to be obtained by the analogue method, a beam of light from a lamp 377 is projected by means of an appropriate optical system on the slits 378 and 379, the beam having sufficient width, as shown, to extend completely across the two slits. A pair of individual light sources in this instance could also be used. The photoelectric cells 381 and 382 receive, respectively, total amounts of light corresponding to the data under the respective slits and produce voltages corresponding thereto. That is, voltages may be supplied to analogue amplifiers 388 and 389 and the sum or difference obtained electrically by connecting the amplifiers together. In this case, a single photoelectric tube may perhaps be used as well as a single amplifier if desired.

A photoelectric cell 391 is focused on the slit 378 by an appropriate optical system in order that a pulse may be obtained for each scan. This is a synchronizing pulse which may be amplified in an amplifier 392 and utilized as already described. A further photoelectric cell 393 is also focused by an appropriate optical system on a portion of a slit 378 in order to detect any time reference marks that the record 84 may have.

Since the signals obtained from the apparatus of Fig. 29 are either unitary pulses or analogue signals, these may be supplied to apparatus of Figs. 9 and 17 in order to produce further unitary records of computations or analyses made.

By selecting the spacing between slits 378 and 379 the differences between or sums of data spaced any desired time units apart may be obtained. The synchronizing pulses from amplifier 392 and the time reference pulses from amplifier 394 may appropriately identify the computed or analyzed data.

The computation according to the apparatus of Fig. 29 and the re-recording thereof according to the apparatus of Fig. 9, may take place very rapidly since the operation of all the electronic elements of Fig. 29 is rapid and the record 84 may be moved very rapidly as already pointed out in this specification. Likewise, the recording of the computed data may be very rapid since the electronic apparatus of Fig. 9 operates rapidly and the record 84 may also be moved rapidly.

In Fig. 30 there is shown computing and re-recording apparatus according to the invention in which an average value of data is obtained by the analogue method and is re-recorded. In this figure, the record 84, made according to the apparatus of Fig. 9, is being reproduced according to the apparatus of Figs. 18 and 29 and is being re-recorded according to the apparatus of Figs. 9 and 17. The width of the slit in mask 395 is such that it spans over the desired number of time units for which the average value is to be obtained. The light source 396 supplies a beam of light of correct width through appropriate apparatus and the photoelectric cell 397 provides a voltage corresponding to this value. The voltage from photoelectric cell 397 may be amplified and supplied to the galvanometer 231 corresponding to that of Fig. 17.

The record 84a of Fig. 30 corresponds to the record 84 of Fig. 17. The voltage supplied to galvanometer 231 of Fig. 30 will make a unitary record on the film 84a as described in connection with Fig. 17. A synchronizing pulse may be obtained from the record 84 of Fig. 30 for each row of data which passes the viewing slit. These synchronizing pulses may be supplied to a scale T counter 398 which produces an output signal whenever T pulses are supplied to it. If the average value of data is to be obtained for every ten pieces of data, the counter 398 would provide an output signal whenever it receives ten pulses. The output pulses from counter 398 may be fed to a flash lamp power supply and control circuit which in turn energizes a lamp to provide a unitary mark on the record 84a as already described. Thus, there is a unitary or data row identifying mark made on record 84a for every average value of ten pieces of data which is recorded. From record 84 of Fig. 30 time reference pulses may be obtained if there are such notations on the record. Any desired use of these pulses may, of course, be made.

The apparatus cooperating with record 84a of Fig. 30 is identical, in general, with that shown in Fig. 17 and the apparatus of Fig. 30 makes a transverse unitary record, according to the invention, of computed average values.

In Fig. 31 there is shown reproducing and recording apparatus for computing averages of data values according to the unitary method. In this figure, the reproducing apparatus associated with the data record 84 is essentially the apparatus shown in Fig. 18 and the apparatus associated with the record 84b is essentially the apparatus of Fig. 9.

The drive apparatus for data record 84 operates as already described and pulses produced by photoelectric cell 264 are amplified and supplied to a scale $n_x$ counter 399. The counter 399 provides an output pulse whenever $x$ input pulses are received by it, $x$ in this instance being the number of time intervals over which the data are to be averaged. That is, if the average of ten pieces of data is to be obtained, $x$ would be equal to ten and the counter 399 would supply one pulse for every ten pulses received by it. The pulses from counter 399 are supplied to the scale of one thousand counters 212 and 213 (Fig. 9). It is assumed in this example, that the recording accuracy is to be one-tenth of one percent of full scale. The photoelectric cell 272 receives a light pulse for each row of data which passes under the slit 259. The pulses from the photoelectric cell 272 may be amplified and supplied to a scale $n_x = n_t$ counter 401. Counter 401 supplies an output pulse whenever it receives a number of pulses corresponding to the time interval over which the average is to be obtained, that is, ten in the specific instance. The output pulses from counter 401 are supplied to the scale of 2 counter 219 and to the power supply and sweep control circuit 161 as described in connection with Fig. 9.

When the number of pulses for ten pieces of data have been received by counter 399, and supplied for example, in the ratio of one to ten to the counter 213, the counter 219 energizes its coil 221 and connects the counter 212 to the counter 399 as described in connection with Fig. 9. Hence, the subsequent number of pulses for ten pieces of data in the ratio of one to ten is supplied to counter 212. The recording made of record 84b for each scan of that record is one-tenth of the number of pulses scanned and counted from the record 84. Hence, the record 84b is an average of the desired data of record 84 made by the unitary method. The transverse unitary recording on record 84b is made in precisely the same manner as described in connection with Fig. 9 and the counters 212 and 213 shown as three counters of ten in series are the same as single counters of one thousand.

While scanning record 84, time reference pulses will be received by photoelectric cell 277 if such marks are on the record 84. If these marks have any significance they may be re-recorded on record 84b as described in connection with Fig. 9.

The apparatus of Fig. 31 operates rapidly and the limitations as to how fast data may be computed or recorded depends upon the speed at which relays, for example, can operate since the counters and other electronic apparatus operate very rapidly.

While there has been disclosed apparatus for computing differences, sums and averages by analogue and unitary methods, it will be clear that other computations can be made once the transverse unitary recordings of the data are had. The computation made according to the disclosure of Figs. 29, 30 and 31 are shown as being re-recorded on transverse unitary records. From these records, the computations can be obtained later by a simple playback operation.

The computations according to Figs. 29, 30 and 31 result in output voltages of either the pulse or the analogue type. These can be supplied to well known graphic, tabular or punched card apparatus in order to obtain final records of this type if desired, as illustrated diagrammatically by the reference characters 62, 63 and 64 of Fig. 1.

Throughout this specification a preferred accuracy of recording has been indicated as being one-tenth of one percent in terms of full scale. This figure comes from a comparison of the unitary recording system according to the invention and a binary system such as is used in connection with code tapes.

A binary system capable of recording values up to approximately one thousand would require about the same area as a unitary system according to the invention having the same capacity. If values greater than one thousand are to be recorded, the binary system would tend to become more efficient of space than the unitary.

A transverse unitary record may be used for computing values according to any function, for example, $y=kx$. In Fig. 32, a record 402 of this form wherein the constant $k$ is 2 is shown. In this figure, the line of marks 403 may be, in effect, a plot of values of $x$ from 0 to 25, and the parallel lines 404 may be, in effect, a plot of values of $y$. The lines 404 and the marks 403 are made according to the disclosures previously made in this specification. The imaginary line $x$—$x$ is a base line and may be parallel to the lines 404 and parallel to the direction of movement of the record as shown by the arrow A. An imaginary line extending from the first mark 405 and transversely of the record, that is, transversely of the base line $x$—$x$ would intersect the ends of the first two parallel lines 406 and 407. Hence, a $y$ value of 2 corresponds to an $x$ value of 1. This would, of course, be found by playing back the record 402 as already described. The mark 408, being the $x$ value of 2, corresponds to the $y$ value of 4 as determined by the parallel lines 406, 407, 409 and 410. This also would be found by a simple playback of this record. There is for each value of $x$, as represented by the number of marks in line 403, a value of $y$ twice as great as determined by the number of ends of lines 404, which an imaginary line perpendicular to the base line $x$—$x$ and extending from the particular $x$ mark will intersect.

The record 402 may be played back, for example, by forming the record on a continuous band and having it scanned by the apparatus already described for each value to be computed. The number of $x$ marks would be entered in the playback apparatus and the corresponding $y$ value would be counted.

The left ends of the lines 404, in effect, form an outline of the function $y=kx$. A record corresponding to any function may be constructed in accordance with the principles described and utilized for computing values.

In Fig. 33 there is shown apparatus by means of which tabular data (51 of Fig. 1) may be recorded on a transverse unitary record according to the invention. The recording apparatus, as such, of Fig. 33, is the same as that of Fig. 9 and corresponding parts bear the same reference characters. In addition, the structure of Fig. 33 includes a tabulating machine 400, such for example as an ordinary adding machine. The printing wheels of machine 400 are provided with contacts so that pulses equal in number to the value of the digit printed are made, this being indicated diagrammatically by the broken line rectangule 411 and the broken lines extending therefrom to the tabulating machine.

The tabulating machine 400 may be of a well known type in which the desired keys are punched and the lever 412 actuated to cause the number to be printed, for example, the number 345 as shown. The tabulating machine may include a roll of paper 413 upon which all numbers tabulated are printed for a check of the final recording. The tabulating machine shown is of the type in which the column in which a number is tabulated is determined by the order in which the keys are pushed. To tabulate the number 345, the 5 key is pushed first, the 4 key is pushed second and the 3 key is pushed last. As values up to one thousand are to be recorded and tabulated, three columns are sufficient since this will tabulate from zero to 999. Since there may be tabulations only in three columns there are three conductors 414, 415 and 416 shown extending from the tabulating machine 400 to the counters 212 and 213.

The counters 212 and 213 are shown as three counter units $a$, $b$, and $c$ of scale ten each. Each counter unit separately has counts or pulses placed therein from zero to nine or one to ten, and in the actual recording step, the counter units are connected in series whereby, in effect the three digit number is set in a scale of one thousand counter. One of the counter units 212$a$ and 213$a$ receive the pulses corresponding to the first digit of the number, one of the counter units 212$b$ and 213$b$ receive the pulses corresponding to the second digit of the number and one of the counter units 212$c$ and 213$c$ receive the pulses corresponding to the third digit of the number. If the number 345 is to be recorded, one of the counter units 212$a$ and 213$a$ receive five pulses, one of the counter units 212$b$ and 213$b$ receive four pulses and one of the counter units 212$c$ and 213$c$ receive three pulses.

Suppose that the number 345 has been entered on the machine 400 and the various contacts of the recording apparatus are as shown. There will then be three counts placed in counter unit 213$a$ through conductors 416 and 417 and closed contacts 418. No output pulse comes from counter unit 213$a$ since this is obtained only for a full scale of ten. Four counts are placed in counter unit 213$b$ through the conductor 415, closed contacts 419 and conductor 421. No output pulse comes from counter unit 213$b$ since this is obtained only for a full scale of ten. Three counts are placed in counter unit 213$c$ through conductor 414, closed contacts 422 and conductor 423. No counts are entered in any of the units of counter 212. Actuation of lever 412 tabulates the number 345 and at the same time supplies a pulse to the scale of 2 counter 219 through conductor 420. This causes the coils 221$a$, 221$b$ and 221$c$ to be energized thereby moving the contacts 418, 419, 422 and 424 to the dotted line positions whence the counter units 212$a$, 212$b$ and 212$c$ are connected to the tabulating machine. A subsequent number entered on the tabulating machine would then result in counts being placed in the counter units through the circuits as follows: From conductor 416 through conductor 425 and contacts 424, shown dotted, to counter unit 212$a$; from conductor 415 through contacts 419, shown dotted, and conductor 426 to counter unit 212$b$; and from conductor 414 through contact 422, shown dotted, and conductor 427 to counter unit 212$c$.

The actuation of lever 412, referred to immediately preceding, also supplied a pulse to the power supply and sweep control circuit 161 through conductor 429 thereby causing the tube 174 to scan the record 84 which has been exposed to the light in the manner described in connection with Fig. 9. Scan of the record 84 during recording supplies pulses through the unitary pulse amplifier 219 to the units of counter 213 in series through the conductors 217 and 428.

The three counter units 213$a$, 213$b$ and 213$c$ will produce an output or readout signal at conductor 211 only when the unit 213$c$ reaches full scale. This will occur when six hundred fifty-five pulses have been supplied to the counter 213 as a result of the recording scan (a full scale of one thousand counts is being utilized).

That is to say, the recording process of Fig. 33 is a complementary process in the same manner as the process described for Fig. 9. When the counter 213 gives a readout signal, the spot grid control circuit 207 turns off the spot of the tube 174 as already described and the apparatus is set for the next value to be recorded. This will be initated by a further actuation of lever 412 which will supply a pulse to counter 219. This in turn will cause coils 221a, 221b and 221c to move the associated contacts to the solid line positions whereupon a new data value may be placed in counter 213, and the data value already existing in counter 212 will be recorded.

Time reference pulses to identify positions on the record may be supplied to terminal 145a in any manner desired. The speed of recording is determined by the speed with which machine 400 is operated.

In Fig. 34 there is shown apparatus for carrying out the invention when it is desired to record data from a punched card (51 of Fig. 1) indicated by the reference character 431. This card has the number 345 punched in the first three columns.

The recording apparatus, as such, is the same as shown in Fig. 33 and thus is the same as that described in connection with Fig. 9. Corresponding parts of Figs. 9, 33 and 34 are designated by the same reference characters.

The punched card 431 is adapted to move in the direction of the arrow and in so doing, the contacts 432, 433, and 434 are adapted to slide over the first three columns of numbers. The card is moved intermittently by well known means, that is, in steps corresponding to each digit and corresponding therewith pulses or counts are supplied to the counters through gate circuits 435, 436 and 437.

Associated with the mechanism for moving the card 431 is an emitter 438 which may comprise a rotating contact arm 439 adapted to engage contacts designated respectively 0, 1, 2, 3, 4, 5, 6, 7, 8, and 9. The contact arm 439 is adapted to be driven by a motor 441 through a one turn clutch 442 operated by a magnet 443. The contact arm 439 makes one revolution for each complete movement, that is, from zero through nine digits on the card 431. After each revolution, clutch 442 is de-energized by means of a cam 444 which opens the energizing circuit for clutch 442.

With contact arm 439 on the zero contact, a circuit is completed from B+ through conductors 445 and 446 to the On positions of gates 435, 436 and 437. In this position of contact arm 439, the card 431 will have its zero digits under the contacts 432, 433 and 434. For each step movement of the contact arm 439, a pulse or count will be supplied through the gates to the respective counters. These counts are supplied from emitter 438 through the contact arm 439 as follows: From the respective ones of the terminals 1, 2, 3, etc., and the conductors connected thereto through conductor 447 to the In position of the gates 435, 436 and 437. From gate 435, the pulses are supplied from the Out position through conductors 448 and 449, contact 418, shown solid, to counter unit 213a. From gate 436, the pulses are supplied from the Out position through conductor 451, contact 419, shown solid, and conductor 452 to counter unit 213b. From gate 437 the pulses are supplied from the Out position through conductor 453, contact 422, shown solid, and conductor 454 to counter unit 213c. Thus, a pulse will be supplied to each counter unit for each step in the movement of card 431 (and each step of arm 439) until the respective gates are turned off.

The gates are turned off when the holes punched in the card come between the erespective contacts whereby circuits are completed to the Off position of the counter. When the digit 3 of the number 345 entered in card 431 comes between contacts 444, a circuit is completed to the Off position of gate 437 from the source B+ through closed contacts 434 and conductor 455. When the digit 4 of the number 345 comes between the contacts 433, a circuit is completed to the Off position of gate 436 as follows: From B+ through closed contacts 343 and conductor 456. The gate 436 thus allows one more count or pulse to enter counter unit 213b than did the gate 437 for counter 213c. When the digit 5 of the number 345 comes between the contacts 432, a circuit is completed to the Off position of gate 435 as follows: From B+ through closed contacts 432 and conductor 457. The gate 435 thus permits one more pulse to be supplied to counter unit 213a than did the gate 436 for the counter unit 213b. Since the gates are now all turned off, further movement of the contact arm 439 causes no more pulses or counts to be placed in the counter units. The counter 213 now has placed in it similarly to Fig. 33, a count of 345. When contact arm 439 again reaches the zero position, a pulse is supplied from conductors 445 and 458 to the scale of 2 counter 219, thereby energizing the coils 221a, 221b and 221c and causing the contacts 418, 419 and 422, and 424 to assume the dotted line positions. This places counter units 212a, 212b and 212c in position to receive counts from emitter 438.

At the same time a pulse is supplied from emitter 438 through conductors 445 and 446 to the power supply and sweep control circuit 161. Since the record 84 and the associated recording operating apparatus operate in a manner similar to that the recorder represented in Fig. 9, the cathode ray tube 174 is energized and begins its scan of the record 84 which has perviously been exposed to the floodlight as described in connection with the Fig. 9.

The pulses created by the recording scan are amplified by the unitary pulse amplifier 219 and supplied through conductors 217 and 459 to counter 213. The recording process continues until six hundred fifty-five counts have been put into counter 213 whereupon an output or readout signal is obtained from counter unit 213c and the spot grid control circuit turns off the tube 174. Three hundred forty-five marks thus remain on the record 84. While the counts in counter 213 are being recorded, the counter 212 is receiving counts from the next succeeding card and the process continues.

If time reference pulses are desired on the record 84 they may be provided at terminal 145a in any manner desired.

The speed of recording of the appartus of Fig. 34 is determined by the speed of operation of punched card apparatus.

Without further elaboration, the foregoing will so fully explain the gist of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. Apparatus for recording specific values of data on a photographic film comprising, a first mask having a series of uniformly spaced and substantially identical openings therein and being disposed to overlie said film; a source of light for illuminating all of said openings; a further mask having a series of uniformly spaced and substantially identical openings therein and being disposed to overlie said film alongside said first mask, the openings in said further mask being disposed to expose the spaces between the openings in said first mask; the total number of openings in said further mask corresponding to a certain maximum value of such data and there being a linear relationship between values of such data and the number of said openings corresponding thereto; light spot means for scanning the openings in said further mask beginning at the same side of said mask for each scan; means for sensing each data value as an integral number of units, each unit corresponding to one of said openings, means controlled by said sensing means for actuating said light spot means to scan, for each value of data, a number of the openings in said further mask equal to the difference between the total number of openings in said further mask and the number of openings equal to the integral number of units corresponding to the particular piece of data; and means for relatively moving said film and said further mask along a line transverse to the line of the openings in said further mask and in the same direction for each scan.

2. Apparatus for recording specific values of data on a photographic film comprising, a first mask having a series of uniformly spaced and substantially identical openings therein and being disposed to overlie said film; a source of light for illuminating all of said openings; a further mask having a series of uniformly spaced and substantially identical openings therein and being disposed to overlie said film alongside said first mask, the openings in said further mask being disposed to expose the spaces between the openings in said first mask; the total number of openings in said further mask corresponding to a certain maximum value of such data and there being a linear relationship between values of such data and the number of said openings corresponding thereto; light spot means for scanning the openings in said further mask beginning at the same side of said mask for each scan; means for sensing each data value as an integral number of units, each unit corresponding to one of said openings, means controlled by said sensing means for actuating said light spot means to scan, for each value of data, a number of the openings in said further mask equal to the difference between the total number of openings in said further mask and the number of openings equal to the integral number of units corresponding to the particular piece of data; and means for moving said film relative to said further mask along a line transverse to the line defined by the openings in said further mask and in the same direction for each scan.

3. Apparatus for recording specific values of data on a photographic film comprising, a first mask having a series of uniformly spaced and substantially identical openings therein and being disposed to overlie said film; a source of light for illuminating all of said openings; a further mask having a series of uniformly spaced and substantially identical openings therein and being disposed to overlie said film alongside said first mask, the openings in said further mask being disposed to expose the spaces between the openings in said first mask; the total number of openings in said further mask corresponding to a certain maximum value of such data and there being a linear relationship between values of such data and the number of said openings corresponding thereto; a further opening in said further mask at one end of the openings therein and of smaller longitudinal dimension; light spot means for scanning the openings and said further opening in said further mask beginning at the further opening side of said mask for each scan; means for sensing each data value as an integral number of units, each unit corresponding to one of said openings; means controlled by said sensing means for actuating said light spot means to scan, for each value of data, said further opening and a number of the openings in said further mask equal to the difference between the total number of openings in said further mask and the number of openings equal to the integral number of units corresponding to the particular piece of data; and means for moving said film relative to said further mask along a line transverse to the line defined by the openings in said further mask and in the same direction for each scan.

4. Apparatus for recording specific values of data on a photographic film comprising, a first mask having a series of uniformly spaced and substantially identical openings therein and being disposed to overlie said film; a source of light for illuminating all of said openings; a further mask having a series of uniformly spaced and substantially identical openings therein and being disposed to overlie said film alongside said first mask, the openings in said further mask being disposed to expose the spaces between the openings in said first mask; the total number of openings in said further mask corresponding to a certain maximum value of such data and there being a linear relationship between values of such data and the number of said openings corresponding thereto; a first further opening in said further mask at one end of the openings therein and of smaller longitudinal dimension; a second further opening in said further mask at the other end of the openings therein and of smaller longitudinal dimension; light spot means for scanning the openings and said first further opening in said further mask beginning at the first further opening side of said mask for each scan; means for sensing each data value as an integral number of units, each unit corresponding to one of said openings, means controlled by said sensing means for actuating said light spot means to scan, for each value of data, said first further opening and a number of the openings in said further mask equal to the difference between the total number of openings in said further mask and the number of openings equal to the integral number of units corresponding to the particular piece of data; means for intermittently illuminating said second further opening; and means for moving said film relative to said further mask along a line transverse to the line defined by the openings in said further mask and in the same direction for each scan.

5. Apparatus for recording specific values of data on a photographic film comprising, a first mask having a series of uniformly spaced and substantially identical openings therein and being disposed to overlie said film; a source of light for illuminating all of said openings; a further mask having a series of uniformly spaced and substantially identical openings therein and being disposed to overlie said film alongside said first mask, the openings in said further mask being disposed to expose the spaces between the openings in said first mask; the total number of openings in said further mask corresponding to a certain maximum value of such data and there being a linear relationship between values of such data and the number of said openings corresponding thereto; a first further opening in said further mask at one end of the openings therein and of smaller longitudinal dimension; a second further opening in said further mask at the other end of the openings therein and of smaller longitudinal dimension; light sheet means for illuminating the openings in said further mask beginning at the first further opening side of said mask; means for preventing said sheet light means from illuminating said first further opening; light flash means for illuminating said first further opening for value of data; means for sensing each data value; means controlled by said sensing means for said light sheet means to illuminate, for each value of data, a number of the openings in said further mask equal to the difference between the total number of openings in said further mask and the number of openings corresponding to the particular piece of data; means for intermittently illuminating said second further opening; and means for moving said film relative to said further mask along a line transverse to the line defined by the openings in said further mask and in the same direction for each scan.

6. A data processing system for converting analogue data to a unitary record form characterized by spaced unitary effects disposed in spaced, substantially parallel lines originating at a common base line and representing the magnitudes of said data, said system comprising: a galvanometer coupled to the said data source; a rotatable mirror coupled to the said galvanometer; a source of light; means for focusing light from the said source onto the reflecting surface of the said mirror such that the light reflected from the said surface will be deflected by an amplitude proportional to the magnitude of the said analogue data; and means opaque to light disposed in a position transverse to the direction of reflection of the said light, the said opaque means having a first row of spaced apertures intercepted by the plane of rotation of the said mirror such that the light beams passed by the said apertures constitute unitary quantities and the number of apertures intercepted by the reflected light, and, hence, the number of said unitary quantities, varies with the magnitude of the said analogue data.

7. In a data processing system for reducing data to a unitary record form characterized by spaced unitary effects disposed in spaced, substantially parallel lines originating at a common base line and representing the magnitudes of said data, the combination comprising a source of data comprising a graphic record having a data line thereon, a spot source of light; means cooperatively related to the said spot source for deflecting the said light repetitively through the same angle; first means for focusing the said light spot onto the surface of the said graphic record such that said deflecting means causes the said light to scan the said record repetitively in a direction transverse to a data line; a first photosensitive device; an opaque mask interposed between the said record and the said device, the said mask having spaced apertures disposed transverse to the direction of movement of said reflected light; second means for focusing a portion of the light reflected from the said graphic record through successive apertures of the said mask to the said first device such that a unitary electrical pulse is produced in response to the light quantity passed by each successive aperture; a second photosensitive device; an output terminal; a gating circuit coupled to the said output terminal and to the said first and second photosensitive devices; means cooperatively related to the said graphic record and coupled to the said gating circuit for producing a gate-opening pulse at the start of each data scan such that said unitary electrical pulses may pass to the said output terminal; means cooperatively related to the said record and selectively responsive to light reflected from the data line of the record for producing a gate-closing pulse such that the number of pulses passing through said gate to said output terminal is proportional to the magnitude of said data; and means cooperatively related to said record for generating an electrical synchronizing pulse at the beginning of each of said deflections of the said light spot.

8. An averaging computer for processing data recorded in a record form characterized by spaced unitary effects disposed in spaced, substantially parallel lines originating at a common base line and representing the magnitudes of said data, said computer comprising: a source of illumination disposed on one side of said record; an opaque mask interposed between said illumination source and said record, the said mask having an aperture dimensioned to span a multiplicity of said lines of unitary effects; means cooperatively related to said illumination source and said record for focusing illumination from said source through said aperture; a photosensitive device disposed on the other side of said record in the path of illumination passing through said effects for producing an electrical output signal such that the quantity of illumination received by said device and the magnitude of said output signal is proportional to the number of effects spanned by said aperture and, thereby, representative of the average value of said effects; means cooperatively related to the said record and the said source of illumination for developing a synchronizing pulse for each line of unitary effects spanned by said aperture; means coupled to the said photosensitive device for recording the said output signal therefrom in accordance with the said unitary record form; and means coupled to the said synchronizing-pulse producing means and the said recording means for actuating the last-mentioned means each time a predetermined number of lines of effects has passed the said aperture.

9. An averaging computer for processing data recorded in a record form characterized by spaced unitary effects disposed in spaced, substantially parallel lines originating at a common base line and representing the magnitudes of said data, said computer comprising: a flying-spot generator disposed on one side of said record; an opaque mask having an aperture for producing unitary light quantities by successively passing light from said generator through the unitary effects of one line of said data at a time; a photosensitive device disposed on the other side of said record for producing an electrical output pulse each time one of said light quantities impinges on said device; a counter coupled to said device for producing a signal pulse each time $n$ output pulses have been received from said device, where $n$ represents the number of lines of effects to be averaged; means cooperatively related to the said record and the said flying-spot generator for producing a synchronizing pulse for each line of unitary effects passing said aperture; means coupled to the said photosensitive device for recording the said output signal therefrom as unitary data in accordance with said unitary record form; and means coupled to the said synchronizing-pulse producing means and the said recording means for actuating the said last mentioned means each time $n$ lines of effects have passed the said aperture.

10. A system for processing data as represented in claim 6 wherein said system also comprises: an elongated record medium having a photosensitive surface disposed parallel to the side of the said opaque means opposite the said light source; an auxiliary aperture in the said opaque means at one end of the said first row of apertures; a second row of spaced apertures in said opaque means parallel to the said first row and positioned such that each of the second row apertures is disposed opposite a space between successive apertures of the first row; means directing a portion of the light from the said source onto the said second row of apertures; and means for transporting the said photosensitive medium in a direction transverse to the said first and second rows of apertures such that a record is produced on the medium in accordance with the aforedescribed form of record, the intervals between successive energizations of the said further light source leaving successive unexposed areas at one edge of the said medium to index the origin of successive transverse lines of unitary effects.

11. A system for processing data as represented in claim 7 wherein said system also comprises: means opaque to light having first and second parallel rows of spaced apertures, each successive aperture of one of the said rows disposed opposite a corresponding space between successive apertures of the other of said rows, the said opaque means further including two horizontally-spaced auxiliary apertures at one end of the said first row; an illuminating light source; means flooding the said second row of apertures with light from the said illuminating source; means for generating a spot source of light; means coupled to the said output terminal and the said synchronizing-pulse generating means for repetitively sweeping light from the said spot source across the said auxiliary apertures and a number of successive other apertures of the said first row proportional to the difference between the actual and a maximum magnitude of said data; an elongated medium having a photosensitive surface disposed parallel to the side of the said opaque means opposite the said spot and illuminating sources of said light; means coupled to the said medium for transporting the said medium in a direction transverse to the said first and second rows of apertures such that a record is produced on the medium in accordance with the aforedescribed unitary record form, the successive illuminations of the said auxiliary apertures leaving unexposed the respective areas of the said photosensitive surface beneath the portion of the opaque means between the said auxiliary apertures, thereby marking one edge of the said medium to index the origin of successive transverse lines of unitary effects.

12. A system for processing data as represented in claim 7 wherein said system also comprises: a cylinder having equally-spaced surface ridges beginning at one extremity of the cylinder at a line on the surface parallel to the axis of said cylinder, each successive ridge extending in a direction perpendicular to the said line a distance not exceeding $n\Delta$ but greater than $(n-1)^\Delta$, where $n$ represents the number of said ridges and $\Delta$ represents an increment of length equal to the circumference of the cylinder divided by the total number of ridges; an elongated medium; means rotatably supporting the said cylinder in a position transverse to the said medium; means for moving the said medium intermittently in the direction of the longitudinal axis of said medium; means coupled to the said cylinder and responsive to the said electrical pulses for rotating the said cylinder to a position where the surface of the said elongated medium is tangent to a number of ridges equal to the number of said pulses; and means actuated by the last-mentioned means and including a tapper bar for marking the said medium whereby lines of unitary effects are produced in accordance with the aforedescribed unitary record form.

13. A system for processing data as represented in claim 11 wherein said system also includes a data-difference computer comprising: means including a light source for simultaneously scanning the unitary record form with light directed upon lines of effects spaced-apart a predetermined fixed distance; means responsive to light passed through the said effects from said scanning means for producing electrical pulses; and subtracting means coupled to the said pulse-producing means and responsive to the said pulses for yielding a number of output pulses equal to the number of effects by which the effects of one of the said spaced-apart lines exceeds the effects of the other; and means coupled to the said subtracting means for recording the said output pulses.

14. In a data processing system for reducing data in the form of electrical pulses into a unitary record form characterized by spaced unitary effects disposed in spaced, substantially parallel lines originating at a common base line and representing the magnitudes of said data, the combination comprising a cylinder having equally spaced circumferentially extending surface ridges beginning at one extremity of the cylinder at a line on the surface parallel to the axis of said cylinder, said ridges being graduated in length in a regular series, each successive ridge extending in a direction perpendicular to said line for a distance which is incrementally greater than the preceding ridge in the series; an elongated medium; means rotatably supporting said cylinder in a position transverse to said medium; means for moving said medium intermittently in the direction of the longitudinal axis of said medium; means coupled to said cylinder and responsive to the electrical pulses for rotating said cylinder to a position where the surface of said elongated medium is tangent to a number of ridges equal to the number of said pulses; and means actuated by the last mentioned means and including a tapper bar for marking said medium whereby lines of unitary effects are produced in accordance with said unitary record form.

15. In a data processing system in which the data is represented in a unitary record form characterized by spaced unitary effects disposed in spaced, substantially parallel lines originating at a common base line and representing the magnitudes of said data, said system comprising means including a light source for simultaneous scanning of the unitary record form with light directed upon lines of effects which are spaced apart a predetermined fixed distance; means responsive to light passed through said effects from said scanning means for producing electrical pulses; and subtracting means coupled to said pulse producing means and responsive to said pulses for yielding a number of output pulses equal to the number of effects by which the effects in one of said spaced apart lines exceeds the effects in the other; and means coupled to said subtracting means for recording said output pulses.

References Cited in the file of this patent

UNITED STATES PATENTS

| | | |
|---|---|---|
| 2,499,593 | Kreuzer | Mar. 7, 1950 |
| 2,549,071 | Dusek | Apr. 17, 1951 |
| 2,635,195 | Hancock | Apr. 14, 1953 |
| 2,759,784 | Burke | Aug. 21, 1956 |
| 2,771,596 | Bellamy | Nov. 20, 1956 |